(12) United States Patent
Kiyose et al.

(10) Patent No.: US 7,571,240 B2
(45) Date of Patent: Aug. 4, 2009

(54) SERVICE PROVIDING SYSTEM THAT PROVIDES SERVICES AND TERMINAL DEVICE THAT REQUESTS SERVICES VIA A WIRELESS NETWORK

(75) Inventors: Katsumi Kiyose, Nagoya (JP); Masaaki Hibino, Yokkaichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 736 days.

(21) Appl. No.: 10/329,677

(22) Filed: Dec. 27, 2002

(65) Prior Publication Data

US 2003/0126039 A1 Jul. 3, 2003

(30) Foreign Application Priority Data

| Dec. 27, 2001 | (JP) | 2001-396110 |
| Mar. 29, 2002 | (JP) | 2002-095244 |

(51) Int. Cl.
G06F 15/16 (2006.01)
G06F 15/173 (2006.01)
G06F 15/177 (2006.01)

(52) U.S. Cl. .............. 709/229; 707/100; 370/351; 455/517

(58) Field of Classification Search ......... 709/200–203, 709/217–238; 707/100; 370/351; 455/517
See application file for complete search history.

(56) References Cited

U.S. PATENT DOCUMENTS 6,330,586 B1 * 12/2001 Yates et al. ................. 709/201
6,628,934 B2 * 9/2003 Rosenberg et al. .......... 455/411
7,236,976 B2 * 6/2007 Breitenbach et al. ........ 707/100
2002/0037733 A1 * 3/2002 McKenna et al. ........... 455/517
2002/0075844 A1 * 6/2002 Hagen ........................ 370/351
2002/0176377 A1 * 11/2002 Hamilton .................... 370/328
2003/0088511 A1 * 5/2003 Karboulonis et al. ........ 705/39
2006/0105781 A1 * 5/2006 Ueda et al. ............... 455/456.1

FOREIGN PATENT DOCUMENTS

| JP | A 64-10168 | 1/1989 |
| JP | A 2-157925 | 6/1990 |
| JP | A 9-168066 | 6/1997 |
| JP | A 11-353133 | 12/1999 |
| JP | A 2000-177212 | 6/2000 |
| JP | A 2000-263881 | 9/2000 |
| JP | A 2001-346258 | 12/2001 |

* cited by examiner

Primary Examiner—Haresh N Patel
(74) Attorney, Agent, or Firm—Oliff & Berridge, PLC

(57) ABSTRACT

A service providing system including an administrator terminal device, a user terminal device, and a service providing device. The service providing device authorizes a process to register a user terminal device after determining that the service providing device is connectable to both the user terminal device and the administrator terminal device via a wireless network. When the service providing device is under the care and supervision of the administrator, the service providing device is entrusted to register the user terminal device, thereby providing services to the user terminal device without burdening the administrator. The system further includes an image outputting device as one of service providing devices. The system adjusts a timing of producing an image, depending on who stays in a communication range.

28 Claims, 16 Drawing Sheets

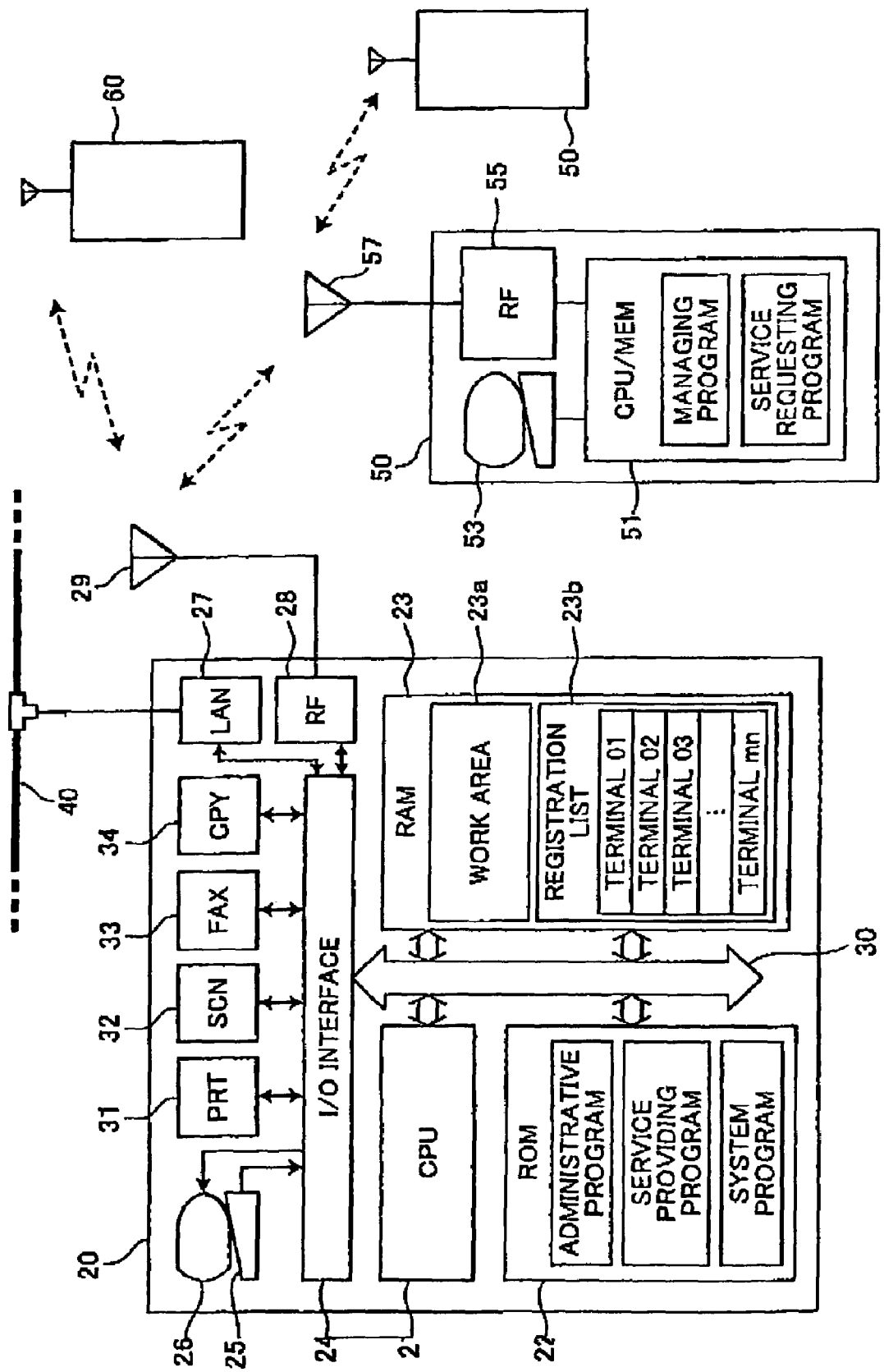

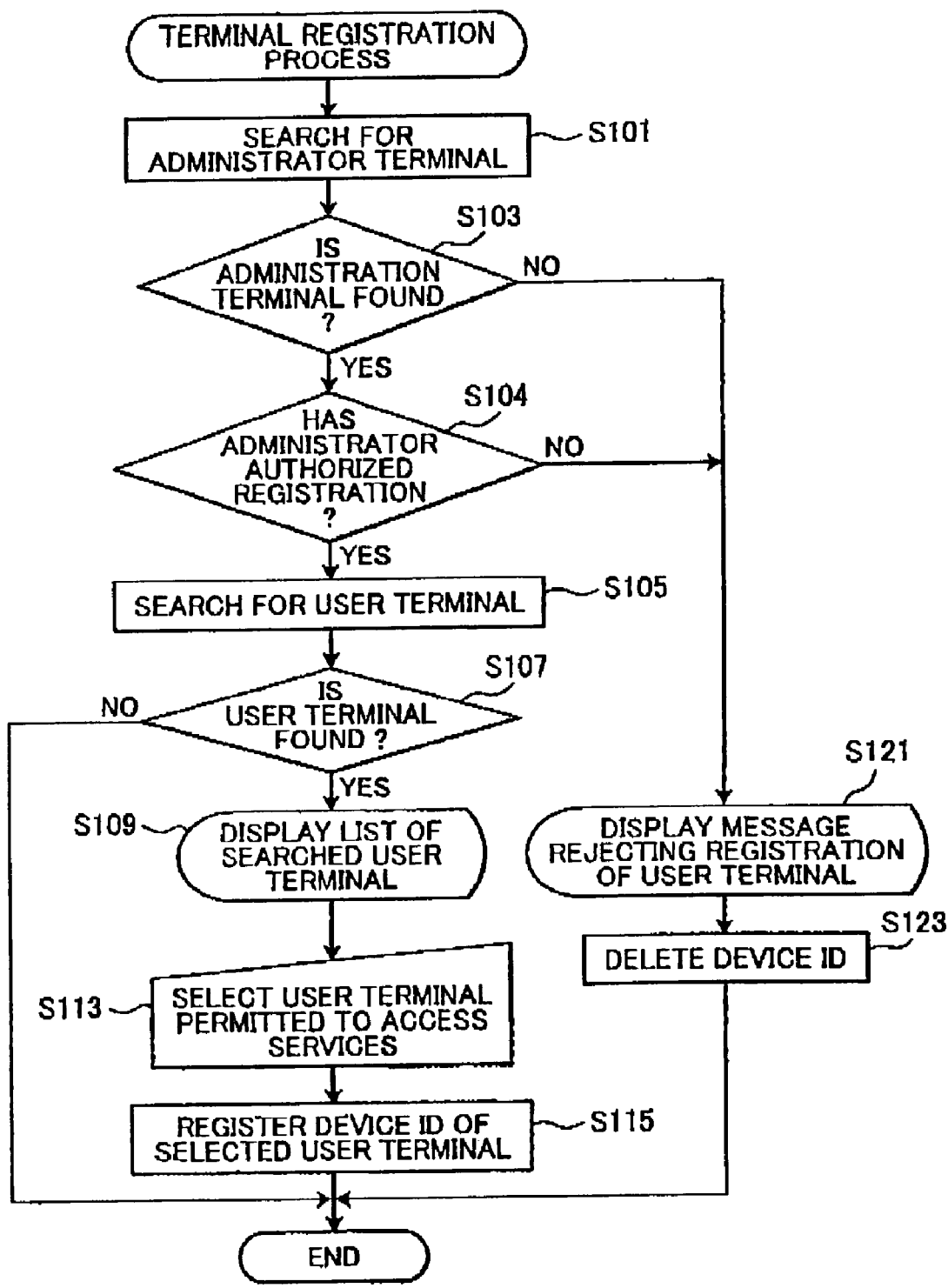

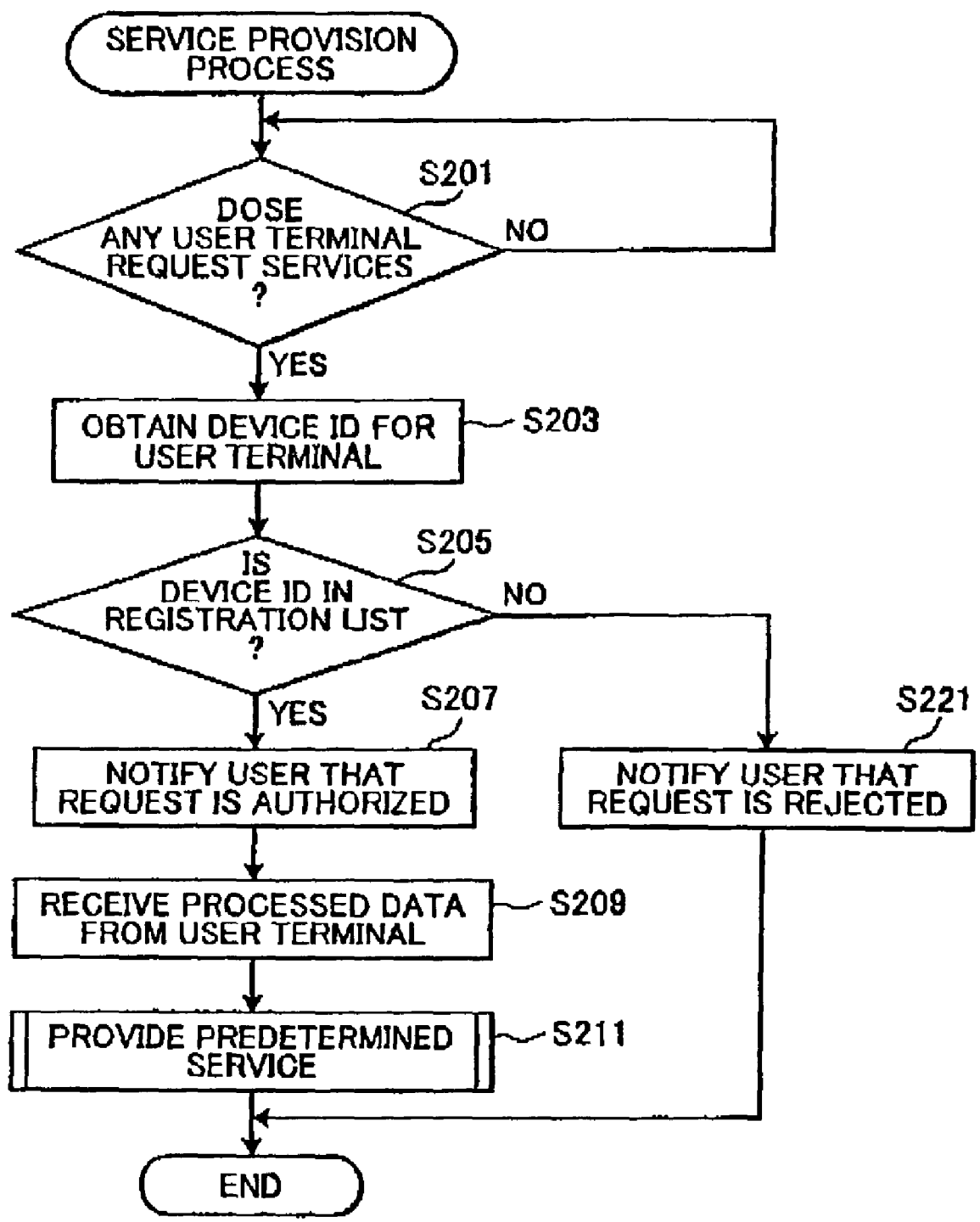

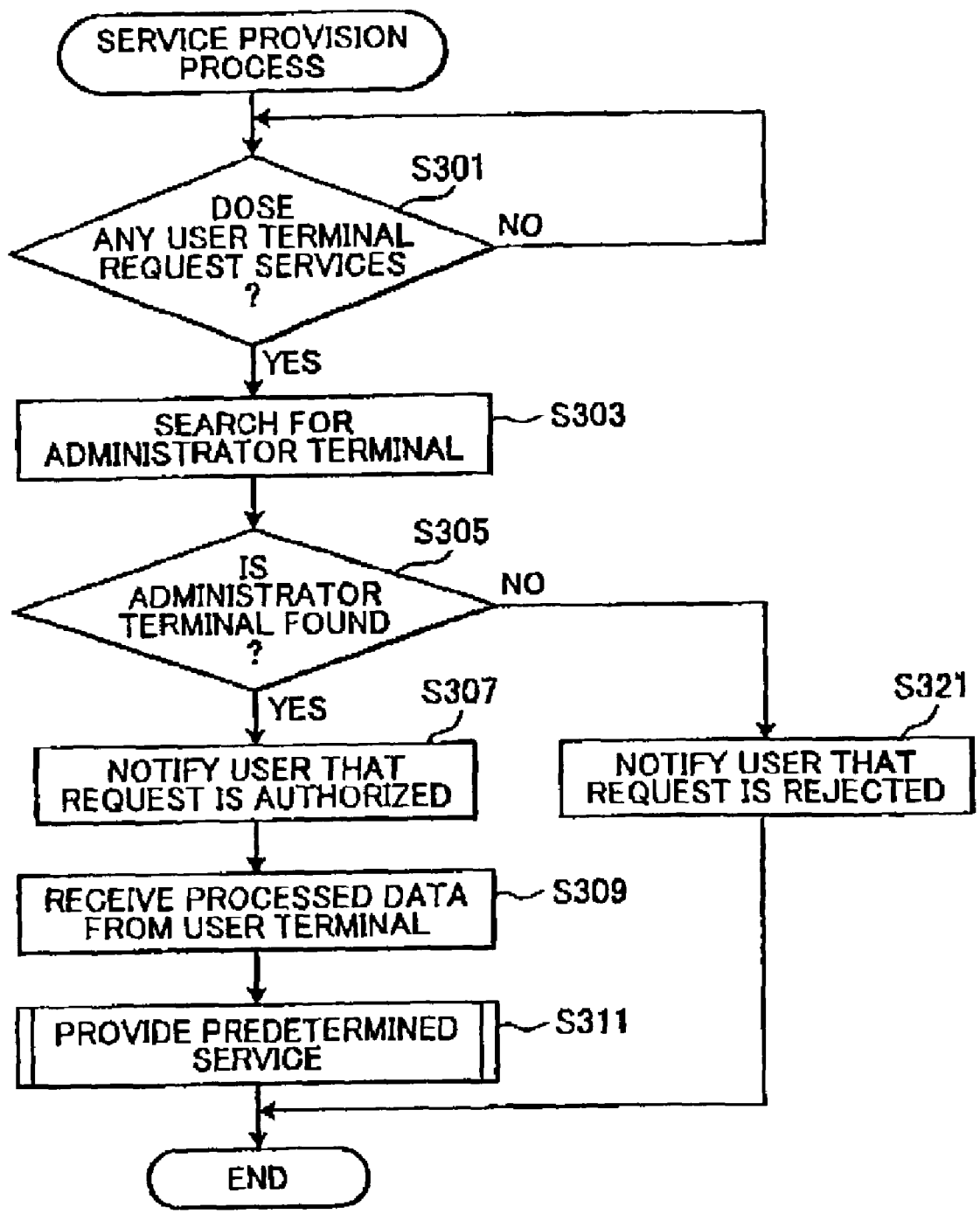

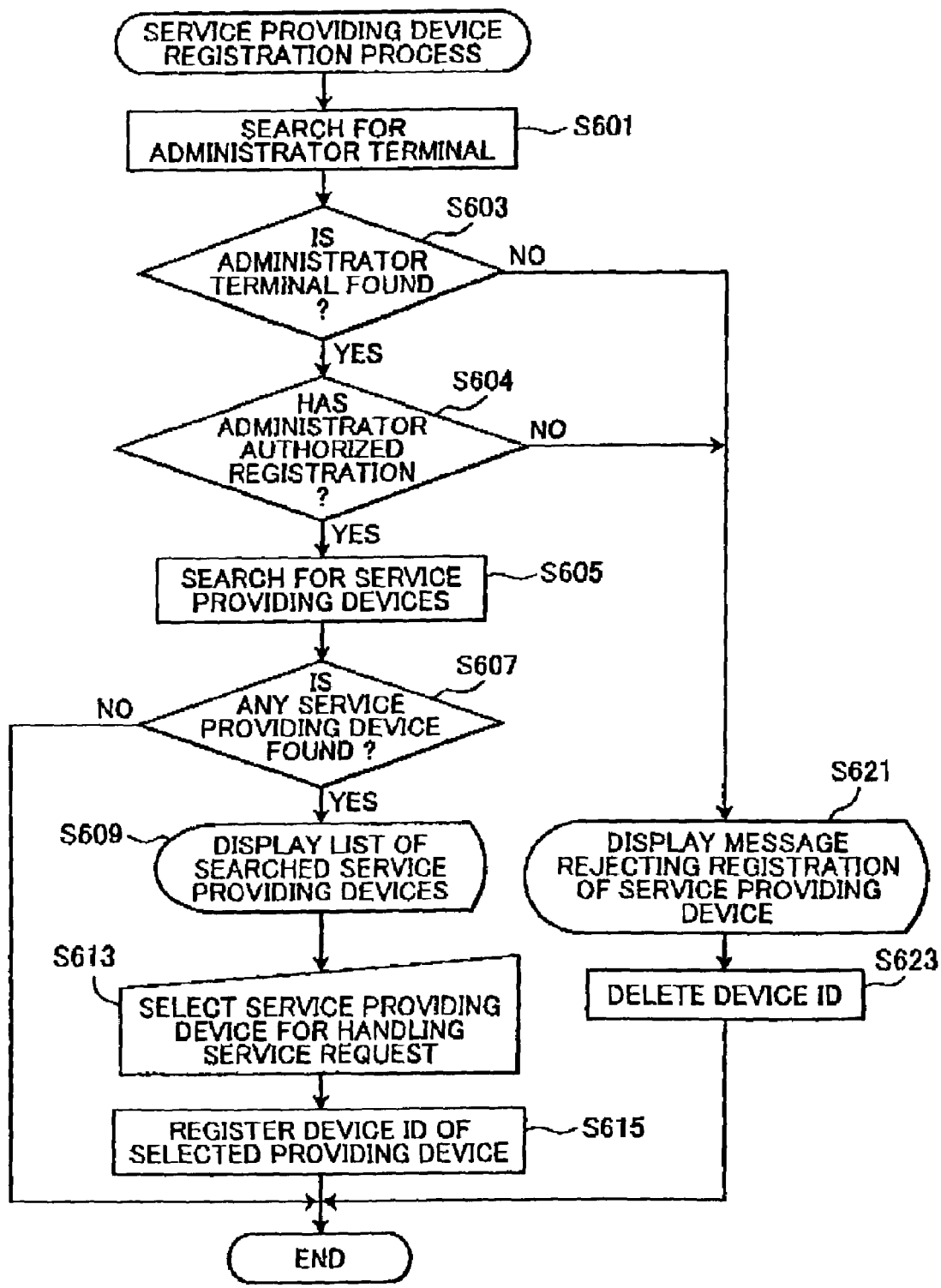

FIG.13A

SECURITY DB

| USER | USER ID | BD_ADDR | SECURITY Lv |
|---|---|---|---|
| A MANAGER | A0011 | FE:54:33:01:98:AB | A |
| C SUB-MANAGER | C0023 | FE:54:33:02:93:FF | C |
| D | D0435 | FE:54:33:01:90:01 | D |
| E | E0564 | FE:54:33:04:98:DF | D |
| ⋮ | ⋮ | ⋮ | ⋮ |

FIG.13B

PRINTING JOB DATA

| USER ID | SECURITY Lv | JOB DATA LENGTH | JOB DATA |
|---|---|---|---|
| D0435 | D | 3654 | JOB DATA 1 |
| A0011 | A | 45906 | JOB DATA 2 |
| C0023 | C | 204 | JOB DATA 3 |
| D0435 | D | 3421 | JOB DATA 4 |
| ⋮ | ⋮ | ⋮ | ⋮ |

SERVICE PROVIDING SYSTEM THAT PROVIDES SERVICES AND TERMINAL DEVICE THAT REQUESTS SERVICES VIA A WIRELESS NETWORK

BACKGROUND OF THE INVENTION

1. Field of the Invention

The present invention relates to a system including a service providing device e.g. an outputting device for outputting images, a terminal device possessed by a user of the service providing device, and an administrator terminal device possessed by a person managing either the service providing device or the user's terminal device.

2. Description of the Related Art

Today it is not difficult to construct a wireless network (a wireless LAN, for example) between computer systems and the like having an appropriate wireless interface and, by providing wireless terminal devices in the area in which communication is possible. Here, a wireless terminal device is a terminal device equipped with a wireless interface conforming to IEEE 802.11b or IEEE 802.11a or the like, or Bluetooth, a standard that is practical for short-range wireless communications. Various services are also available based on data transmission between such devices.

However, while it is easy to construct a wireless network, services provided on these networks are often requested from and provided to unregistered users. As a result, the wireless network must be constructed with an authentication system for services provided to and requested from these wireless terminal devices.

In a common authorization system, a user name and password must be entered for each valid user in a computer, network server, or the like. Hence, each time a new user wishing to access services or the like from a wireless terminal device equipped with Bluetooth, for example, is checked, the system administrator must enter the user's name and password, or unique data for the terminal device in a computer or the like. Similarly, a user wishing to access network services, for example, from a wireless terminal device employing Bluetooth or the like must input a password and the like each time the user wishes to request a service.

In other words, the system administrator must perform a procedure for entering a user's name, password, or the like each time an unregistered wireless terminal device links to the wireless network including a predetermined service providing device, thereby placing a burden on the system administrator. Further, the user must input a password using the wireless terminal device each time the user requests a service, thereby placing a burden on the user.

In addition to the above, conventional image outputting systems used to output images by an image outputting device have sometimes employed devices to prevent an inappropriate third party from viewing the image in order to maintain confidentiality and protect the privacy of the user.

For example, it is conceivable to maintain confidentiality and protect privacy through an image outputting system that includes a portable device, a detector for detecting the portable device when positioned within a communication range, an instrument for determining whether any device is detected by the detector, a image outputting unit for outputting an image, and a controller for controlling the printer to output images based on whether any device exists within the communication range as determined by the instrument.

If the image outputting unit of the image outputting system is a printer, the detector is disposed near the printer to detect when the user of the printer is nearby. Accordingly, the system can control the printer to output printed materials when the user of the portable device is near the printer, thereby maintaining confidentiality and protecting the user's privacy.

To take a specific example, a boss or superior in a company who owns a portable device is outputting printed material that the superior does not wish his subordinates to see. By using this image outputting system, the subordinates will not be able to see the printed material while the superior is away from the printer.

However, when the owner of the portable device (superior) approaches the printer while a third party (subordinate) is nearby, the printed material will be outputted by this image outputting system. Therefore, there is a possibility that the third party may see the material.

SUMMARY OF THE INVENTION

In view of the foregoing, it is an object of the present invention to provide a service providing system which provides or receives requests for a predetermined service without burdening the person managing either the service providing device or the user terminal device, a service providing device, and a user terminal device.

It is another object of the present invention to provide a service providing system including a service providing unit that is capable of preventing a third party near the service providing unit from seeing material outputted from the system.

These object and others will be attained by a service providing system including a service providing device providing services; a user terminal device belonging to a user of the service providing device that is connectable to the service providing device via a wireless network; and an administrator terminal device belonging to the administrator of the service providing device and capable of being connected to the service providing device via a wireless network. The service providing system further includes a determining unit for determining whether the administrator terminal device is connected to the service providing device via a wireless network and for determining whether the user terminal devices is connectable to the service providing device via a wireless network; and an authorizing unit for authorizing a predetermined process by the service providing device when the determining unit determines that the user terminal device is connectable to the service providing device via a wireless network and the administrator terminal device is connectable to the service providing device via a wireless network.

Hence, the predetermined process provided by the service providing device is authorized when both the user terminal device and administrator terminal device are determined to be connectable with the service providing device via a wireless network.

If the administrator terminal device belonging to an administrator who manages the service providing device is connected to the service providing device via a wireless network, then the administrator is located within a range of the service providing device in which wireless connection is possible. If the user terminal device is connected to the service providing device via a wireless network when the administrator is within this range, then the service providing device can authorize a predetermined process independently of the administrator. In other words, since the service providing device is within a range under the care and supervision of the administrator, the service providing device can be entrusted to perform a predetermined process on the user terminal device. Accordingly, the predetermined service can be provided without burdening the administrator.

The above objects will also be attained by a service providing system including a service providing device capable of providing services; a user terminal device belonging to a user of the service providing device that can be connected to the service providing device via a wireless network; and an administrator terminal device belonging to the administrator of the service providing device and capable of being connected to the service providing device via a wireless network. The service providing system further includes a determining unit for determining whether the administrator terminal device is connected to the service providing device via wireless network for determining whether the user terminal devices can be connected to the service providing device via a wireless network; and an authorizing unit for authorizing a predetermined process by the service providing device, after confirming that an authorization instruction has been received from the administrator terminal device connected via the wireless network, when the determining unit determines that the user terminal device can be connected to the service providing device via a wireless network and the administrator terminal device can be connected to the service providing device via a wireless network.

Hence, the predetermined process provided by the service providing device is authorized after confirming that an authorization instruction has been received from the administrator terminal device and when both the user terminal device and administrator terminal device are determined to be connectable with the service providing device via a wireless network.

If the administrator terminal device belonging to an administrator who manages the service providing device is connected with the service providing device via a wireless network, then the administrator is located within a range of the service providing device in which wireless connection is possible. If the user terminal device is connected to the service providing device via a wireless network when the administrator is within this range, then the service providing device can authorize a predetermined process independently of the administrator, after confirming that an authorization instruction has been received from the administrator terminal device. In other words, since the service providing device is within a range under the care and supervision of the administrator, the service providing device can be entrusted to perform a predetermined process on the user terminal device, provided only that the administrator has issued an authorization instruction from the administrator terminal device. Accordingly, the predetermined service can be provided without burdening the administrator.

This object and others will be attained by a service providing system including a service providing device providing services; a user terminal device belonging to users of the service providing device that can be connected to the service providing device via a wireless network; and an administrator terminal device belonging to the administrator of the user terminal device and capable of being connected to the user terminal device via a wireless network. The service providing system further includes a determining unit for determining whether the administrator terminal device can be connected to the user terminal device via a wireless network and for determining whether the user terminal device can be connected to the service providing device via a wireless network; and an authorizing unit for authorizing the user terminal device to perform a predetermined process on the service providing device when the determining unit determines that the user terminal device can be connected to the service providing device via a wireless network and that the administrator terminal device can be connected to the service providing device via a wireless network.

Accordingly, the user terminal device is authorized to perform a predetermined process on the service providing device when both the service providing device and administrator terminal device are determined to be connectable to the user terminal device via a wireless network.

If the administrator terminal device belonging to an administrator who manages the user terminal device is connected to the user terminal device via a wireless network, is then the administrator is located within a range of the user terminal device in which wireless connection is possible. If the user terminal device is connected to the service providing device via a wireless network when the administrator is within this range, then the user terminal device is authorized to perform a predetermined process on the service providing device independently of the administrator. In other words, since the user terminal device is within a range under the care and supervision of the administrator, the user terminal device can be entrusted to perform a predetermined process on the service providing device. Accordingly, the user terminal device can manage the predetermined process without burdening the administrator.

This object and others will be attained by a service providing system including a service providing device capable of providing services; a user terminal device belonging to a user of the service providing device that can be connected to the service providing device via a wireless network; and an administrator terminal device belonging to the administrator of the user terminal device and capable of being connected to the user terminal device via a wireless network. The service providing system further includes a determining unit for determining whether the administrator terminal device can be connected to the user terminal device via a wireless network and for determining whether the user terminal device can be connected to the service providing device via a wireless network; and an authorizing unit for authorizing the user terminal device to perform a predetermined process on the service providing device after confirming that an authorization instruction has been received from the administrator terminal device connected via the wireless network and when the determining unit determines that the user terminal device can be connected to the service providing device via a wireless network and that the administrator terminal device can be connected to the service providing device via a wireless network.

Hence, the user terminal device is authorized to perform a predetermined process on the service providing device after confirming that an authorization instruction has been received from the administrator terminal device connected via the wireless network and when both the service providing device and administrator terminal device are determined to be connectable to the user terminal device via a wireless network.

If the administrator terminal device belonging to an administrator who manages the user terminal device is connected to the user terminal device via a wireless network, then the administrator is located within a range of the user terminal device in which wireless connection is possible. When the administrator is within this range, therefore, the user terminal device is authorized to perform a predetermined process on the service providing device after confirming an authorization instruction from the administrator terminal device. In other words, since the user terminal device is within a range under the care and supervision of the administrator, the user terminal device can be entrusted to perform a predetermined process on the service providing device, provided only that the administrator has issued an authorization instruction from the administrator terminal device. Accordingly, the user terminal device can manage the predetermined process without burdening the administrator.

The above objects will also be attained by a service providing device capable of providing services, including a determining unit for determining whether the service providing device can connect via a wireless network to an administrator terminal device possessed by an administrator who manages the service providing device and whether the service providing device can be connected via a wireless network to a user terminal device possessed by a user of the service providing device; and an authorizing unit for authorizing a predetermined process when the determining unit determines that the service providing device can be connected to both the user terminal device and the administrator terminal device via a wireless network.

In other words, the predetermined process performed by the service providing device is authorized when both the user terminal device and administrator terminal device are determined to be connectable to the service providing device via a wireless network.

If the administrator terminal device belonging to an administrator who manages the service providing device is connected to the service providing device via a wireless network, then the administrator is located within a range of the service providing device in which wireless connection is possible. If the user terminal device is connected to the service providing device via a wireless network when the administrator is within this range, then the service providing device can be authorized to perform a predetermined process independently of the administrator. In other words, since the service providing device is within a range under the care and supervision of the administrator, a predetermined process performed by the service providing device can be entrusted to the user of the user terminal device. Accordingly, the predetermined service can be provided without burdening the administrator.

The above objects will also be attained by a service providing device capable of providing services, including a determining unit for determining whether the service providing device can connect via a wireless network to an administrator terminal device possessed by an administrator who manages the service providing device and whether the service providing device can be connected via a wireless network to a user terminal device possessed by a user of the service providing device; and an authorizing unit for authorizing a predetermined process after confirming that an authorization instruction has been received from the administrator terminal device connected via the wireless network and when the determining unit determines that the service providing device can be connected to both the user terminal device and the administrator terminal device via a wireless network.

If the administrator terminal device belonging to an administrator who manages the service providing device is connected to the service providing device via a wireless network, then the administrator is located within a range of the service providing device in which wireless connection is possible. Therefore, when the administrator is located within this range, the authorizing unit authorizes a predetermined process by he service providing device after confirming that an authorization instruction has been received from the administrator terminal device connected via the wireless network. In other words, since the service providing device is within a range under the care and supervision of the administrator, the service providing device can be entrusted with a predetermined process performed on the user of the user terminal device, provided only that the administrator has issued an authorization instruction from the administrator terminal device. Accordingly, the predetermined service can be provided without burdening the administrator.

The above objects will also be attained by a user terminal device capable of requesting services from a service providing device via a wireless network and including a determining unit for determining whether the user terminal device can be connected via a wireless network to an administrator terminal device possessed by an administrator who manages the user terminal device; and an authorizing unit for authorizing a predetermined process for the service providing device when the determining unit determines that the user terminal device can be connected via a wireless network to the administrator terminal device.

In other words, the user terminal device can be authorized to perform a predetermined process on the service providing device after determining that the service providing device and administrator terminal device can be connected to the user terminal device via a wireless network.

If the administrator terminal device belonging to an administrator who manages the user terminal device is connected to the user terminal device via a wireless network, then the administrator is located within a range of the user terminal device in which wireless connection is possible. When the administrator is within this range, the user terminal device is authorized to perform a predetermined process on the service providing device independently of the administrator. In other words, since the user terminal device is within a range under the care and supervision of the administrator, the user terminal device can be entrusted to perform a predetermined process on the service providing device. Accordingly, the user terminal device can manage the predetermined process without burdening the administrator.

The above objects will also be attained by a user terminal device capable of requesting services from a service providing device via a wireless network and including a determining unit for determining whether the user terminal device can be connected via a wireless network to an administrator terminal device possessed by an administrator who manages the user terminal device; and an authorizing unit for authorizing a predetermined process for the serviced providing device after confirming that an authorization instruction has been received from the administrator terminal device connected via the wireless network and when the determining unit determines that the user terminal device can be connected via a wireless network to the administrator terminal device.

If the administrator terminal device belonging to an administrator who manages the user terminal device is connected to the user terminal device via a wireless network, then the administrator is located within a range of the user terminal device in which wireless connection is possible. When the administrator is within this range, the user terminal device is authorized to perform a predetermined process on the service providing device after confirming an authorization instruction from the administrator terminal device. In other words, since the user terminal device is within a range under the care and supervision of the administrator, the user terminal device can be entrusted to perform a predetermined process on the service providing device, provided only that the administrator has issued an authorization instruction from the administrator terminal device. Accordingly, the user terminal device can manage the predetermined process without burdening the administrator.

According to another aspect of the present invention, a service providing system is provided, including a first device capable of wirelessly transmitting identification data for identifying the first device; a first receiving unit for wirelessly receiving identification data transmitted from the first device when the first device is positioned within a communication range; a first determining unit for determining whether the first device is positioned within the communication range based on the identification data received by the first receiving unit: a service providing unit for providing services; a first controlling unit for providing services to the service providing unit based on the determination by the first determining unit of whether the first device is positioned within the communication range; a second device capable of wirelessly transmitting identification data for identifying the second device; a second receiving unit for wirelessly receiving identification data transmitted from the second device when the second device is positioned within a communication range; a second determining unit for determining whether the second device is positioned within the communication range based on the identification data received by the second receiving unit; and a first restriction controlling unit for applying a restriction on the provision of services by the service providing unit based on the determination by the second determining unit of whether the second device is positioned within the communication range.

With this construction, the service providing unit provides services only when the first device is positioned within the communication range of the first receiving unit (when the first receiving unit recognizes the existence of the first device). However, the system restricts the provision of services by the service providing unit, even when the first device is located within the communication range of the first receiving unit, if the second device is positioned within the communication range of the second receiving unit (that is, when the second receiving unit recognizes the existence of the second device).

Hence, by arranging the first and second receiving unit around the service providing device, it is possible to restrict the provision of services on the service providing unit when the second device is located within the communication range of the second receiving unit, even when the first device is positioned within the communication range of the first receiving unit.

By using the service providing system of the present invention, therefore, it is possible to prevent a third party from viewing sensitive printed material by identifying the device possessed by the third party as the second device and restricting the provision of services on the service providing unit when the second device is near the second receiving unit.

The installation positions of the first and second receiving unit are not limited to locations near the service providing unit, but can be separated any distance therefrom, provided the same effects can be achieved. Further, the service providing unit can be any type of device that provides services, such as a printer, facsimile machine, television, or projector.

The output restrictions applied above can either postpone or cancel the provision of services. When the provision of services is output of an image, the output restrictions may allow output of images that do not contain sensitive content or may blacken portions of the image.

According to another aspect of the present invention, a service providing device includes a first receiving unit for wirelessly receiving identification data transmitted from a first device positioned within a communication range, the first device being capable of wirelessly transmitting identification data identifying itself; a first determining unit for determining whether the first device is positioned within the communication range based on the identification data received by the first receiving unit; service providing unit for providing services; a first output controlling unit for controlling the provision of services from the service providing unit based on the determination by the first determining unit of whether the first device is positioned within the communication range; a second receiving unit for wirelessly receiving identification data transmitted from a second device positioned within a communication range, the second device being capable of wirelessly transmitting identification data identifying itself; a second determining unit for determining whether the second device is positioned within the communication range based on the identification data received by the second receiving unit; and a first restriction controlling unit for applying a restriction on the provision of services from the service providing device based on the determination by the second determining unit of whether the second device is positioned within the communication range with this construction, it is possible to construct the above-described service providing system, while achieving the same operations and effects described for that system.

According to another aspect of the present invention, a detecting device includes a first receiving unit for wirelessly receiving identification data transmitted from a first device positioned within a communication range, the first device being capable of wirelessly transmitting identification data identifying itself; a first determining unit for determining whether the first device is positioned within the communication range based on the identification data received by the first receiving unit; a first output controlling unit for controlling the provision of services from the service providing device, based on the determination by the first determining unit of whether the first device is positioned within the communication range; a second receiving unit for wirelessly receiving identification data transmitted from a second device positioned within a communication range, the second device being capable of wirelessly transmitting identification data identifying itself; a second determining unit for determining whether the second device is positioned within the communication range based on the identification data received by the second receiving unit; and a first restriction controlling unit for applying a restriction on the provision of services from the service providing device based on the determination by the second determining unit of whether the second device is positioned within the communication range. By mounting this detecting device in the service providing device, it is possible to construct a service providing device with the desired functions. Further, it is possible to construct the above-described service providing system, while achieving the same operations and effects described for that system.

According to another aspect of the present invention, a computer program provided in a service providing device for providing services, the program capable of executing a first receiving process for wirelessly receiving identification data transmitted from a first device positioned within a communication range, the first device being capable of wirelessly transmitting identification data identifying itself; a first determining process for determining whether the first device is positioned within the communication range based on the identification data received in the first receiving process; a first output controlling process for controlling the provision of services from the service providing device based on the determination in the first determining process of whether the first device is positioned within the communication range; a second receiving process for wirelessly receiving identification data transmitted from a second device positioned within a communication range, the second device being capable of wirelessly transmitting identification data identifying itself; a second determining process for determining whether the second device is positioned within the communication range based on the identification data received in the second receiving process; and a first restriction controlling process for applying a restriction on the provision of services from the service providing device based on the determination in the second determining process of whether the second device is positioned within the communication range. By installing this computer program in the service providing device, it is possible to construct a service providing device with the desired functions. Further, it is possible to construct the above-described service providing system, while achieving the same operations and effects described for that system.

According to another aspect of the present invention, a service providing system includes a second device capable of wirelessly transmitting identification data for identifying the second device; a second receiving unit for wirelessly receiving identification data transmitted from the second device when the second device is positioned within a communication range; a second determining unit for determining whether the second device is positioned within the communication range based on the identification data received by the second receiving unit; service providing unit for providing services based on commands from an external device; and a second restriction controlling unit for applying a restriction on the provision of services by the service providing unit based on the commands when the second determining unit determines that the second device is positioned within the communication range.

With this construction, the system restricts the provision of services by the service providing unit, even when a command was received from the external device, if the second device is positioned within the communication range of the second receiving unit (that is, when the second receiving unit recognizes the existence of the second device).

Hence, by arranging the second receiving unit around the service providing device, it is possible to restrict the provision of services when the second device is located within the communication range of the second receiving unit, even when a command was received from the external device.

By using the service providing system of the present invention, therefore, it is possible to prevent a third party from viewing sensitive printed material by identifying the device possessed by the third party as the second device and restricting the provision of services when the second device is near the second receiving unit.

According to another aspect of the present invention, a service providing device includes a second receiving unit for wirelessly receiving identification data transmitted from a second device positioned within a communication range, the second device being capable of wirelessly transmitting identification data identifying itself; a second determining unit for determining whether the second device is positioned within the communication range based on the identification data received by the second receiving unit; service providing unit for providing services based on commands from an external device; and a second restriction controlling unit for applying a restriction on the provision of services based on the commands when the second determining unit determines that the second device is positioned within the communication range. With this construction, it is possible to construct the above-described service providing system, while achieving the same operations and effects described for that system.

According to another aspect of the present invention, a detecting device includes a second receiving unit for wirelessly receiving identification data transmitted from a second device positioned within a communication range; the second device being capable of wirelessly transmitting identification data identifying itself; a second determining unit for determining whether the second device is positioned within the communication range based on the identification data received by the second receiving unit; service providing unit for providing service based on commands from an external device; and a second restriction controlling unit for applying a restriction on the provision of services based on the commands when the second determining unit determines that the second device is positioned within the communication range. By mounting this detecting device in the service providing device, it is possible to construct a service providing device with the desired functions. Further, it is possible to construct the above-described service providing system, while achieving the same operations and effects described for that system.

According to another aspect of the present invention, a computer program provided in a service providing device for providing services based on commands from an external device, the program capable of executing a second receiving process for wirelessly receiving identification data transmitted from a second device positioned within a communication range, the second device being capable of wirelessly transmitting identification data identifying itself; a second determining process for determining whether the second device is positioned within the communication range based on the identification data received in the second receiving process; and a second restriction controlling unit for applying a restriction on the provision of services based on the commands when the second determining unit determines that the second device is positioned within the communication range. By installing this computer program in the service providing device, it is possible to construct a service providing device with the desired functions. Further, it is possible to construct the above-described service providing system, while achieving the same operations and effects described for that system.

According to another aspect of the present invention, a service providing system includes a first device capable of wirelessly transmitting identification data for identifying the first device; a first receiving unit for wirelessly receiving identification data transmitted from the first device when the first device is positioned within a communication range; a first determining unit for determining whether the first device is positioned within the communication range based on the identification data received by the first receiving unit; service providing unit for providing services; a first output controlling unit for providing services based on the determination by the first determining unit of whether the first device is positioned within the communication range; a second device capable of wirelessly transmitting identification data for identifying the second device; a second receiving unit for wirelessly receiving identification data transmitted from the second device when the second device is positioned within a communication range; a fourth determining unit for determining whether the second device is nearing the second receiving unit; and a third restriction controlling unit for applying a restriction on the provision of services based on the determination by the fourth determining unit of whether the second device is nearing the second receiving unit.

With this construction, the service providing unit provides services only when the first device is positioned within the communication range of the first receiving unit (when the first receiving unit recognizes the existence of the first device). However, the system restricts the provision of services from the service providing device, even when the first device is located within the communication range of the first receiving unit, if the second device is nearing the second receiving unit.

Hence, by arranging the first and second receiving unit around the service providing unit, it is possible to restrict the provision of services when the second device is nearing the second receiving unit, even when the first device is positioned within the communication range of the first receiving unit.

By using the service providing system of the present invention, therefore, it is possible to prevent a third party from viewing sensitive printed material by identifying the device possessed by the third party as the second device and restricting the provision of services when the second device is nearing the second receiving unit.

Further, the service providing system can limit wasteful the provision of services by restricting the provision of services when the second device approaches the second receiving unit.

The fourth determining unit described above further includes communication range varying unit for increasing or decreasing the communication range; and confirming unit for confirming the range of possible communication with the second device by increasing and decreasing the communication range using the communication range varying unit and determining whether communication with the second device is possible in that communication range. By repeatedly confirming the communication range with the confirming unit, the fourth determining unit can determine when the second device is approaching the service providing device.

According to another aspect of the present invention, a service providing device includes a first receiving unit for wirelessly receiving identification data transmitted from a first device positioned within a communication range, the first device being capable of wirelessly transmitting identification data identifying itself; a first determining unit for determining whether the first device is positioned within the communication range based on the identification data received by the first receiving unit; service providing unit for providing services; a first output controlling unit for controlling the provision of services based on the determination by the first determining unit of whether the first device is positioned within the communication range; a second receiving unit for wirelessly receiving identification data transmitted from a second device positioned within a communication range, the second device being capable of wirelessly transmitting identification data identifying itself; a fourth determining unit for determining whether the second device is nearing the second receiving unit; and a third restriction controlling unit for applying a restriction on the provision of services based on the determination by the fourth determining unit of whether the second device is nearing the second receiving unit. With this construction, it is possible to construct the above-described service providing system, while achieving the same operations and effects described for that system.

According to another aspect of the present invention, a detecting device includes a first receiving unit for wirelessly receiving identification data transmitted from a first device positioned within a communication range, the first device being capable of wirelessly transmitting identification data identifying itself; a first determining unit for determining whether the first device is positioned within the communication range based on the identification data received by the first receiving unit; a first output controlling unit for providing services, based on the determination by the first determining unit of whether the first device is positioned within the communication range; a second receiving unit for wirelessly receiving identification data transmitted from a second device positioned within a communication range, the second device being capable of wirelessly transmitting identification data identifying itself; a fourth determining unit for determining whether the second device is nearing the second receiving unit; and a third restriction controlling unit for applying a restriction on the provision of services based on the determination by the fourth determining unit of whether the second device is nearing the second receiving unit. By mounting this detecting device in the service providing device, it is possible to construct a service providing device with the desired functions, while achieving the same operations and effects described for the service providing system.

According to another aspect of the present invention, a computer program provided in a service providing device for providing services, the program capable of executing a first receiving process for wirelessly receiving identification data transmitted from a first device positioned within a communication range, the first device being capable of wirelessly transmitting identification data identifying itself; a first determining process for determining whether the first device is positioned within the communication range based on the identification data received in the first receiving process; a first output controlling process for providing services based on the determination in the first determining process of whether the first device is positioned within the communication range; a second receiving process for wirelessly receiving identification data transmitted from a second device positioned within a communication range, the second device being capable of wirelessly transmitting identification data identifying itself; a fourth determining process for determining whether the second device is nearing a second receiving unit; and a third restriction controlling process for applying a restriction on the provision of services based on the determination in the fourth determining process of whether the second device is nearing the second receiving unit. By installing this computer program in the service providing device, it is possible to construct a service providing device with the desired functions, while achieving the same operations and effects described for that system.

According to another aspect of the present invention, a service providing system includes a first device capable of wirelessly transmitting identification data for identifying the first device; a second device capable of wirelessly transmitting identification data for identifying the second device; a first receiving unit for wirelessly receiving identification data transmitted from the first device when the first device is positioned within a communication range; a second receiving unit for wirelessly receiving identification data transmitted from the second device when the second device is positioned within a communication range; a third receiving unit for receiving service information associated with the identification data; a first determining unit for determining whether the first device is positioned within the communication range based on the identification data received by the first receiving unit; a second determining unit for determining whether the second device is positioned within the communication range based on the identification data received by the second receiving unit; service providing unit for providing services; a second output controlling unit for providing services based on information received by the third receiving unit and associated with identification data identifying the first device to the service providing unit based on the determination by the first determining unit of whether the first device is positioned within the communication range; a third output controlling unit for providing services received by the third receiving unit and associated with identification data identifying the second device to the service providing unit based on the determination by the second determining unit of whether the second device is positioned within the communication range; and a fourth restriction controlling unit for applying a restriction on the provision of services and a second output controlling unit based on information received by the third receiving unit and associated with identification data identifying the second device.

With this construction, information associated with data identifying the first device received by the third receiving unit are outputted when the first device is positioned within the communication range of the first receiving unit. Similarly, information associated with data identifying the second device received by the third receiving unit are outputted when the second device is positioned within the communication range of the second receiving unit. In other words, if the person possessing the first or second device approaches the first or second receiving unit positioned around the service providing unit in order to view information received by the third receiving unit and associated with identification data, information associated with the corresponding device are outputted when the first or second receiving unit determines that the first or second device is within the communication range.

With this service providing system, it is reasonable to assume that, when the third receiving unit receives service information associated with data identifying the second device, the owner of the second device will approach the service providing unit to view the information. Therefore, it is desirable that the service providing system of the present invention apply a restriction to the provision of services and the second output controlling unit. With this configuration, it is possible to prevent information associated with data identifying the first device from being seen by the owner of the second device.

According to another aspect of the present invention, a service providing device includes a first receiving unit for wirelessly receiving identification data transmitted from a first device positioned within a communication range, the first device being capable of wirelessly transmitting identification data identifying itself; a second receiving unit for wirelessly receiving identification data transmitted from a second device positioned within a communication range, the second device being capable of wirelessly transmitting identification data identifying itself; a third receiving unit for receiving service information associated with the identification data; a first determining unit for determining whether the first device is positioned within the communication range based on the identification data received by the first receiving unit; a second determining unit for determining whether the second device is positioned within the communication range based on the identification data received by the second receiving unit; service providing unit for providing services; a second output controlling unit for controlling the provision of services based on the information received by the third receiving unit and associated with identification data identifying the first device to the service providing unit based on the determination by the first determining unit of whether the first device is positioned within the communication range; a third output controlling unit for controlling the provision of services based on the information received by the third receiving unit and associated with identification data identifying the second device to the service providing unit based on the determination by the second determining unit of whether the second device is positioned within the communication range; and a fourth restriction controlling unit for applying a restriction on the provision of services and a second output controlling unit based on the information received by the third receiving unit and associated with identification data identifying the second device. With this construction, it is possible to construct the above-described service providing system, while achieving the same operations and effects described for that system.

According to another aspect of the present invention, a detecting device includes a first receiving unit for wirelessly receiving identification data transmitted from a first device positioned within a communication range, the first device being capable of wirelessly transmitting identification data identifying itself; a second receiving unit for wirelessly receiving identification data transmitted from a second device positioned within a communication range, the second device being capable of wirelessly transmitting identification data identifying itself; a third receiving unit for receiving service information associated with the identification data; a first determining unit for determining whether the first device is positioned within the communication range based on the identification data received by the first receiving unit; a second determining unit for determining whether the second device is positioned within the communication range based on the identification data received by the second receiving unit; a second output controlling unit for controlling the provision of services based on the information received by the third receiving unit and associated with identification data identifying the first device to a service providing unit for providing services based on the determination by the first determining unit of whether the first device is positioned within the communication range; a third output controlling unit for controlling the provision of services based on the information received by the third receiving unit and associated with identification data identifying the second device to the service providing unit based on the determination by the second determining unit of whether the second device is positioned within the communication range; and a fourth restriction controlling unit for applying a restriction on the provision of services and a second output controlling unit based on the information received by the third receiving unit and associated with identification data identifying the second device. By mounting this detecting device in the service providing device, it is possible to construct a service providing device with the desired functions, while achieving the same operations and effects described for the service providing system.

According to another aspect of the present invention, a computer program provided in a service providing device for providing services, the program capable of executing a first receiving process for wirelessly receiving identification data transmitted from a first device positioned within a communication range, the first device being capable of wirelessly transmitting identification data identifying itself; a second receiving process for wirelessly receiving identification data transmitted from a second device positioned within a communication range, the second device being capable of wirelessly transmitting identification data identifying itself; a third receiving process for receiving service information associated with the identification data; a first determining process for determining whether the first device is positioned within the communication range based on the identification data received in the first receiving process; a second determining process for determining whether the second device is positioned within the communication range based on the identification data received in the second receiving process; a second output controlling process for controlling the provision of services based on the information received in the third receiving process and associated with identification data identifying the first device to the service providing device based on the determination in the first determining process of whether the first device is positioned within the communication range; a third output controlling process for providing services based on the information received in the third receiving process and associated with identification data identifying the second device to the service providing device based on the determination in the second determining process of whether the second device is positioned within the communication range; and a fourth restriction controlling process for applying a restriction on the provision of services and in the second output controlling process based on the service information received in the third receiving process and associated with identification data identifying the second device. By installing this computer program in the service providing device, it is possible to construct a service providing device with the desired functions, while achieving the same operations and effects described for that system.

BRIEF DESCRIPTION OF THE DRAWINGS

In the drawings:

FIG. 2 is a block diagram showing the administrative system according to the first embodiment;

FIG. 3 is a flowchart showing steps in a process for registering a terminal device that is executed by a service providing device according to the first embodiment;

FIG. 5 is a flowchart showing steps in a process for providing services that is executed by the service providing device according to the first embodiment;

FIG. 6 is a flowchart showing steps in a modification of the service providing process of FIG. 5 that is executed by the service providing device according to the first embodiment;

FIG. 7c is a flowchart showing steps in a process for registering the service providing device that is executed by the user terminal device according to the second embodiment;

FIGS. 13A-13B includes tables illustrating a security database and print job data stored in the printer of FIG. 10;

DESCRIPTION OF THE PREFERRED EMBODIMENTS

An administrative system, a service providing device, and a user terminal device according to preferred embodiments of the present invention will be described while referring to the accompanying drawings.

Figure 1A:
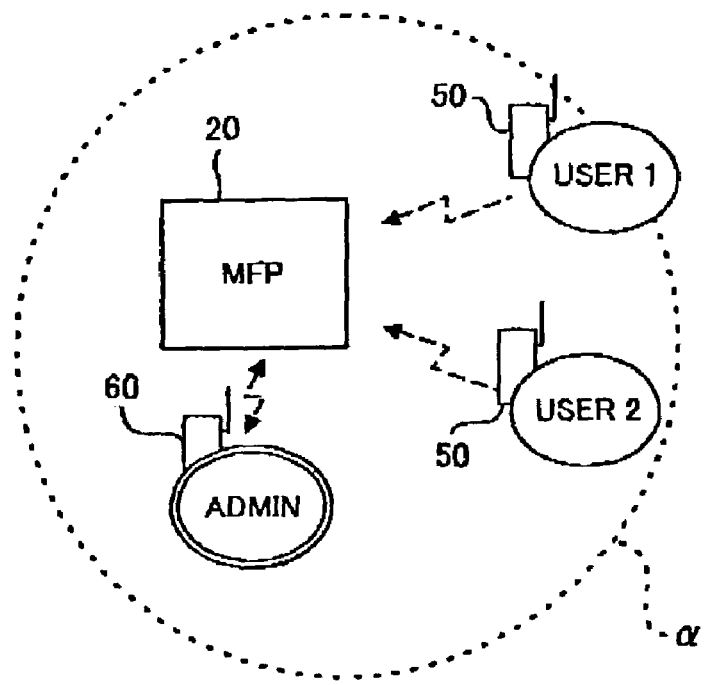
FIGS. 1A-1B are explanatory drawings showing an administrative system according to a first embodiment of the present invention.
Figure 1B:
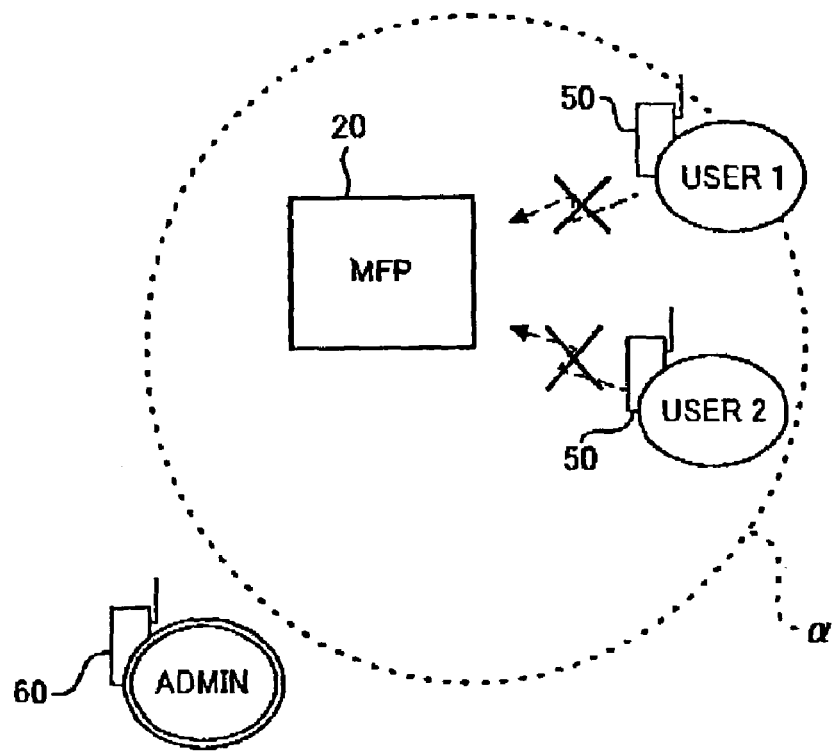

First, an outline of an administrative system according to a first embodiment of the present invention will be described with reference to FIGS. 1A and 1B. As shown in FIG. 1A, the administrative system includes a service providing device 20 capable of supplying services; user terminals 50 that are possessed by users using the service providing device 20 and that can be connected to the service providing device 20 via a wireless LAN; and an administrator terminal 60 that is possessed by an administrator who manages the service providing device 20 and that can be connected to the service providing device 20 via a wireless LAN. The administrator terminal 60 can manage the service providing device 20 without needing the administrator's instructions, depending on whether the administrator terminal 60 is determined to be connectable to the service providing device 20 via a wireless LAN (FIG. 1A) or not (FIG. 1B).

Here, the service providing device 20 is a multifunctional peripheral for supplying different kinds of services such as a printer, copier, facsimile, or image scanning device. The circle a shown in FIG. 1 represents an area in which devices can connect to the service providing device 20 via the wireless LAN.

Next, the configuration of the service providing device 20, the user terminal 50, and the administrator terminal 60 constituting the present administrative system will be described with reference to FIG. 2. As shown in FIG. 2, the service providing device 20 is primarily provided with a CPU 21, a ROM 22, a RAM 23, an input/output interface 24, input keys 25, a display 26, a LAN unit 27, a wireless unit 28, an antenna 29, a printing unit 31, a scanning unit 32, a facsimile unit 33, and a copy unit 34.

The CPU 21 is connected to the ROM 22, the RAM 23, and the input/output interface 24 via a system bus 30. The CPU 21 is provided for controlling the service providing device 20. System programs controlling the CPU 21 and administrative programs described later are stored in the ROM 22. The CPU 21 reads these programs from the ROM 22 and develops the programs in a work area 23a of the RAM 23. Because of these programs, the CPU 21 can sequentially execute steps of a terminal registration process described later (see FIG. 3).

The ROM 22 is a read only memory connected to the system bus 30, and functions as a part of the main storage space used by the CPU 21. System programs and administrative programs, as well as service providing programs executed by the service providing device 20 are pre-stored in the ROM 22.

The RAM 23, a readable and writable volatile memory, is connected to the system bus 30, and also functions as a component of the primary storage used by the CPU 21. The RAM 23 can be formed of DRAM (Dynamic RAM), for example. The storage area of the RAM 23 is defined and allocated as a plurality of areas described below, including the work area 23a, and a registration list 23b.

The work area 23a allocated in the RAM 23 is used for executing the system programs and the administrative programs described later. Required work data and intermediate files are temporarily stored in this storage area.

Similarly, the registration list 23b stores device IDs for the user terminals 50 that are authorized to receive different services provided by the service providing device 20. Examples of the device ID are a Bluetooth device address (hereinafter referred to as BD address), and a link key if the user terminal 50 is a cellular telephone, or a personal digital assistant (PDA) with Bluetooth or another wireless interface. The BD address is data unique to the terminal device that can identify the user terminal 50. The registration list 23b is updated or referenced through a service provision process executed by the service providing device 20.

The input/output interface 24 is connected to the system bus 30, and transfers data transactions between the input keys 25, the display 26, the LAN unit 27, the wireless unit 28, the printing unit 31, the scanning unit 32, the facsimile unit 33 and the copy unit 34.

The input keys 25 are connected to the system bus 30 via the input/output interface 24, and are provided on an operating panel of the service providing device 20. The input keys 25 are used for selecting a user terminal 50 which requests any services among those in a list displayed on the display 26. The input keys 25 are used for inputting other data related to various functions of the service providing device 20. Generally, the input keys 25 are configured of a predetermined number of push-type switches. However, the input keys 25 can also be configured of a touch panel input system provided on the surface of the display 26 in order to simplify input operations.

The display 26 outputs data capable of identifying a user terminal 50 based on the device ID received from the user terminal 50. The display 26 is connected to the system bus 30 via the input/output interface 24. The display 26 may be configured of a liquid crystal display or a plasma display. A surface of the display 26 can be provided with the above-described touch panel serving as the input keys 25.

The LAN unit 27 is connected to the system bus 30 via the input/output interface 24, and transfers data between a LAN cable 40 and the CPU 21. If the LAN unit 27 is a type of a bus LAN, the LAN unit 27 includes a LAN board compliant with 10BASE-T according to IEEE 802.3, and can transfer data at a maximum data transfer rate of 10 Mbps.

The wireless unit 28 is connected to the system bus 30 via the input/output interface 24, and serves as an RF module achieving short-range wireless communications using Bluetooth. Under bluetooth, the wireless unit 28 can achieve a maximum data transfer rate of 1 Mbps within a radius of 10 meters or 100 meters by a frequency hopping method of spread spectrum modulation at a wireless frequency of 2.4 GHz. The radius in which communications is possible can be adjusted in stages by changing the transmission output of the wireless unit 28. By changing the communication radius, it is possible to adjust the range α shown in FIGS. 1A and 1B according to the needs of the administrator.

The antenna 29 emits radio waves of the frequency band 2.4 GHz received from the wireless unit 28 into the air, and receives radio waves having the same frequency from the air and transmits the received radio waves to the wireless unit 28. The antenna 29 may be configured of a multilayered chip antenna formed from a multilayered dielectric.

The printing unit 31 is connected to the system bus 30 via the input/output interface 24 for providing a function to print images or text in monochrome or color as one of the services. For example, after receiving processed data from the user terminal 50 via the LAN unit 27 or wireless unit 28, the CPU 21 converts the data to a predetermined data format, and transmits the data to the printing unit 31. As a result, the printing unit 31 can provide a service to the user terminal 50 for printing text or images on a predetermined paper based on this process data.

The scanning unit 32 is connected to the system bus 30 via the input/output interface 24 for providing a function for scanning text or images in monochrome or color as one of the services. The CPU 21 receives text or image data read by the scanning unit 32, and converts the data to a predetermined data format. Subsequently, the data is provided to the user terminal 50 via the LAN unit 27 and wireless unit 28.

The facsimile unit 33 is connected to the system bus 30 via the input/output interface 24 for providing a function to electronically transmit text or images in monochrome or color as one of the services. After receiving processed data from the user terminal 50 via the LAN unit 27 and wireless unit 28, the CPU 21 converts the data to a predetermined data format, and subsequently transmits the data to the facsimile unit 33. The facsimile unit 33 provides a service for sending text and images based on the processed data to a predetermined destination. Further, data for images and text received by the facsimile unit 33 is transmitted to the CPU 21. The CPU 21 converts the data to a predetermined data format. Subsequently, the CPU 21 transmits the data to the user terminal 50 via the LAN unit 27 and wireless unit 28.

The copy unit 34 is connected to the system bus 30 via the input/output interface 24 for providing a function to copy text or images in monochrome or color as one of the services.

The user terminal 50 and the administrator terminal 60 may be a cellular telephone or a PDA equipped with a Bluetooth wireless interface, and have a function for transmitting a device ID identifying themselves to the service providing device 20.

Here, the construction of the user terminal 50 as a cell phone or a PDA will be described with reference to FIG. 2. Since the administrator terminal 60 has the same construction as the user terminal 50, a description of the administrator terminal 60 has been omitted.

As shown in FIG. 2, the user terminal 50 includes a control unit 51, an input/output unit 53, a wireless unit 55, and an antenna 57.

The control unit 51 is provided with a CPU, a ROM, and a RAM, similar to the CPU 21, the ROM 22, the RAM 23, and the input/output interface 24 of the service providing device 20. The control unit 51 stores a service request program for requesting services described later and an administrative program for registering a service providing device. The control unit 51 uses the above programs to do the corresponding processes. In addition, the control unit 51 can provide various functions necessary for a telephone, when the user terminal 50 is a cellular telephone, and various functions for a FDA, when the user terminal 50 is a PDA.

The input/output unit 53 includes the same functions as those of the input keys 25 and display 26 in the service providing device 20 for enabling the control unit 51 to display output data and allowing predetermined data to be inputted into the control unit 51. In other words, the input/output unit 53 includes an output display device such as a liquid crystal display and a touch panel type input device provided on the display surface.

The wireless unit 55 is configured similarly to the wireless unit 2B of the service providing device 20. That is, the wireless unit 55 is an RF module based on the Bluetooth standard, and can perform data communications at a maximum data transfer rate of 1 Mbps within a radius of 10 meters or 100 meters by a frequency hopping method of spread spectrum modulation at the wireless frequency of 2.4 GHz. The radius in which communications is possible can be adjusted by changing the transmission output of the wireless unit 55. By changing the communication radius, it is possible to adjust the range α shown in FIGS. 1A and 1B according to instructions of the administrator.

Next, the processes performed by the service providing device 20 will be described with reference to FIGS. 3-5. FIG. 3 is a flowchart showing the steps in a terminal registering process executed according to the administrative program on the service providing device 20. This process is performed to select and register a user terminal 50 to be permitted to access services provided by the service providing device 20. The process shown in FIG. 3 is executed at predetermined intervals.

As shown in FIG. 3, the service providing device 20 executes a process to search for an administrator terminal 60 in S101. When constructing a piconet using Bluetooth, an Inquiry command is issued in this process to determine whether a connectable administrator terminal 60 is located within the communication range α (see FIG. 1A).

After searching for an administrator terminal 60 in S101, the CPU 21 performs a process in S103 to determine whether a connectable administrator terminal 60 is found. If a connectable administrator terminal 60 is not found (No in S103), this indicates that no administrator terminal 60 exists within the connectable range α of the wireless LAN provided for the service providing device 20 (see FIG. 1B). In other words, the service providing device 20 exists out of the communication area covered by short-range wireless communications using Bluetooth, that is, the area under the care and supervision of an administrator. Since it is necessary to reject the predetermined process by the service providing device 20 (here, the process for registering the user terminal 50), the process jumps to S121 and a message rejecting registration of the user terminal 50 is displayed on the display 26. In S123, the device ID of the user terminal 50 registered in the registration list 23b is deleted and the terminal registration process ends.

However, if a connectable administrator terminal 60 is found (Yes in S103), then the service providing device 20 exists within the area under the care and supervision of the administrator. In S104, the CPU determines whether the administrator has authorized registration of the user terminal 50.

The step of S104 is performed to reconfirm with the administrator whether to authorize registration of the user terminal 50. If the administrator is unable to supervise, this step enables the administrator to reject registration of the user terminal 50 by the service providing device 20 by rejecting registration authorization, even if an administrator terminal 60 exists within the connectable range α of the service providing device 20. Hence, administration of the service providing device 20 can be more stringently managed. Step S104 is not always necessary, and can be removed if stringent management is deemed unnecessary.

If the administrator authorizes registration of the user terminal 50 (Yes in S104), then a process is performed to search for the user terminal 50 in S105. However, if registration of the user terminal 50 is not authorized (No in S104), then a registration denial message is displayed in S121, as described above. The device ID registered in the registration list 23b is deleted in S123 and the registration process ends.

After searching for a user terminal 50 in S105, a process is conducted to determine whether a user terminal 50 is found in S107. If a user terminal 50 is not found in this process (No in S107), then the registration process ends, as no user terminal 50 exists to be registered. However, if the user terminal 50 is found (Yes in S107), then the device ID of the user terminal 50 found in S105 (or identifying data based on the device ID) is displayed in the display 26 in S109. The device ID of the user terminal 50 found above is temporarily stored in the work area 23a.

In S113, a process is performed to select a user terminal 50 which is permitted to access services provided by the service providing device 20 from the list of user terminals 50 displayed on the display 26. The selection process in S113 is performed by the user possessing the user terminal 50.

Figure 4A:
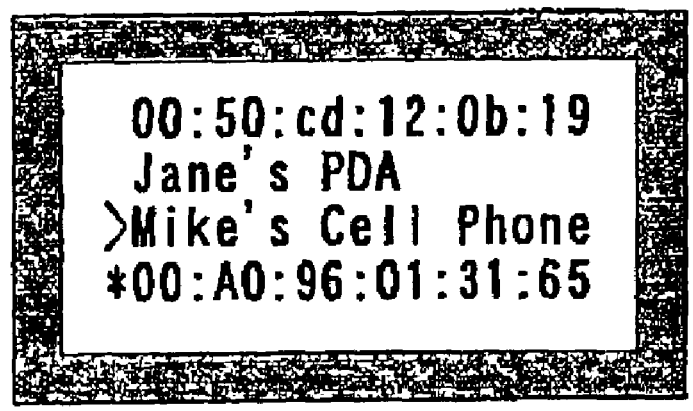
FIGS. 4A-4C are explanatory drawings showing sample lists displayed on a terminal device during the terminal registering process of FIG. 3.

As shown in FIG. 4A, the device ID, a name, or a nickname of the user terminal 50 associated to the device ID such as "00:50:cd:12:0b:19" or "Jane's PDA" are displayed on the display 26. Hence, the user who possesses the user terminal 50 selects a desired device from the displayed list. When the number of user terminals 50 found from the search is such that the device IDs cannot be displayed at one time, remaining identification data can be displayed by scrolling the screen, as shown in FIG. 4(B).

Figure 4B:
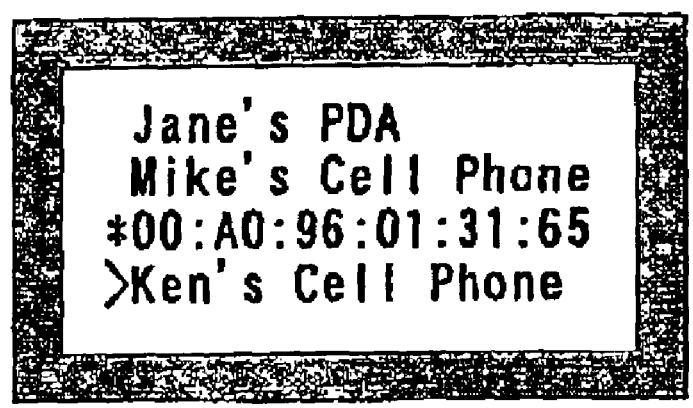
Figure 4C:
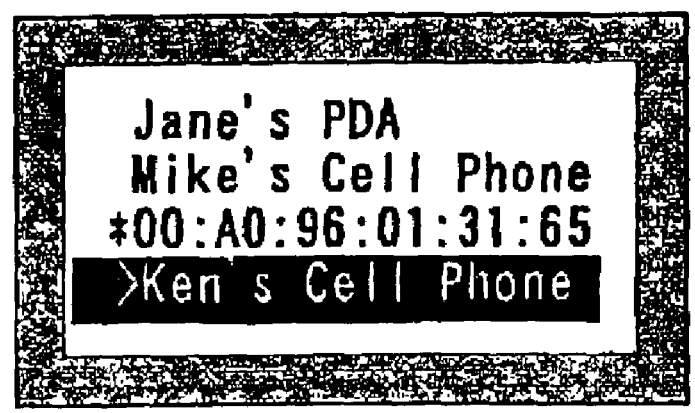

As shown in FIGS. 4A and 4B, in the process for selecting the user terminal 50, the user operates the input keys 25 of the service providing device 20 to move a cursor ">" in order to select a device ID displayed on the display 26. When the user further operates the input keys 25 to confirm the selection, the selection is highlighted, as shown in FIG. 4C, indicating that the selection has been made. A "*" displayed next to the device ID indicates a user terminal 50 that has already been registered by the service providing device 20 in step S115 of FIG. 3.

After the user terminal 50 is selected in S113, the device ID of the selected user terminal 50 is recorded in the registration list 23b in S115. That is, a process is performed to store the device ID, and the registration process ends.

Next, a service provision process will be described with reference to FIG. 5. The service provision process is the process by which the service providing device 20 provides various services to the user of a user terminal 50 registered as described above.

As shown in FIG. 5, the service providing device 20 uses an ordinary predetermined interrupt in step S201 to monitor whether a request for a service has been received from a user terminal 50. If there is a request from a user terminal 50 (Yes in S201), then the service providing device 20 performs a process in S203 to acquire the device ID of the user terminal 50 that issued the request. In S205, the service providing device 26 performs a process to determine whether the acquired device ID exists in the registration list 23b.

If it is determined that the acquired device ID does not exist in the registration list 23b (No in S205), this indicates that the user terminal 50 has not been authorized to receive services from the service providing device 20. In S221, the service providing device 20 notifies the user terminal 50 that the request for services has been rejected, and the service provision process ends.

However, if it is determined that the acquired device ID exists in the registration list 23b (Yes in S05), this indicates that the user terminal 50 has been authorized to receive services from the service providing device 20. Hence, in S207 the service providing device 20 notifies the user terminal 50 that the request for service provision has been authorized. In S209, the service providing device 20 receives processed data for the service request from the user terminal 50. In S211, the requested service is provided. After the service has been provided in S211, the service provision process executed by the service providing device 20 ends.

In this way, the process for registering the user terminal 50 is authorized in steps S109, S113, and S115, when the service providing device 20 determines that the user terminal 50 can be connected via a LAN (YES in S107), and when the service providing device 20 determines that the administrator terminal 60 can be connected via a wireless LAN (Yes in S103). Accordingly, if the administrator terminal 60 belonging to the administrator of the service providing device 20 is connected to the service providing device 20 via the wireless LAN, then that administrator exists within the connectable range α of the service providing device 20. When an administrator exists within this range, the service providing device 20 can be authorized to register the user terminal 50 independently of the administrator, if the user terminal 50 can connect to the service providing device 20 via the wireless LAN. In other words, since the service providing device 20 is within the area under the care and supervision of the administrator, the process for registering the user terminal 50 service providing device 20 can be entrusted to the user possessing the user terminal 50. Accordingly, the present invention has the effect of enabling the service providing device 20 to provide various services without burdening the administrator.

Service provision by the service providing device 20 can also be executed according to the process shown in FIG. 6. As shown in FIG. 6, the service providing device 20 monitors whether or not a request has been received from a user terminal 50 in step S301. If a request is received from the user terminal 50 (Yes in S301), then the service providing device 20 executes a process in S303 to search for the administrator terminal 60. In S305, the service providing device 20 determines whether the administrator terminal 60 has been found. Based on the results of this determination, the service providing device 20 can perform processes in steps S307, S309, S311, and S321 in the same way as the processes were executed in S207, S209, S211, and S221 described above.

According to this process, the service providing device 20 can authorize the user terminal 50 to access services provided by the service providing device 20, if an administrator terminal 60 exists within the connectable range α for the wireless LAN. In other words, since the service providing device 20 is within the area under the care and supervision of the administrator, the service providing device 20 can provide services to the owner of the user terminal 50 without requiring a complex registration procedure. Therefore, the service providing device 20 can provide various services without burdening the administrator and the user.

Figure 7A:
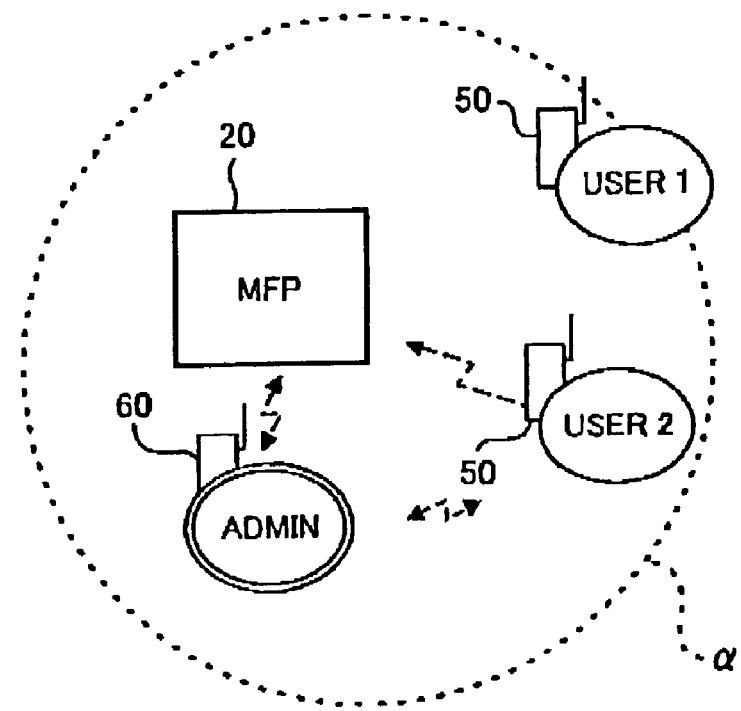
FIGS. 7A and 7B are a drawing showing an administrative system according to a second embodiment of the present invention.
Figure 7B:
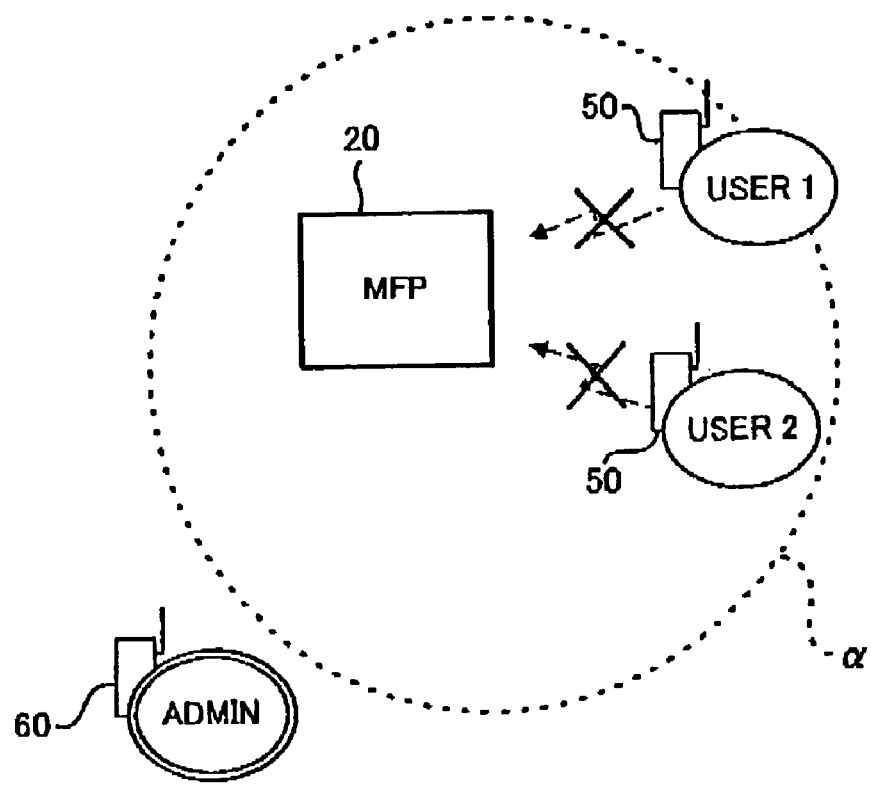

Next, a management system according to a second embodiment of the present invention will be described with reference to FIGS. 7-9. An administrative system according to the second embodiment enables the user terminal 50 to perform predetermined processes on the service providing device 20 as shown in FIG. 7A, when it is determined that both the service providing device 20 and the administrator terminal 60 can connect to the user terminal 50 via a wireless LAN range. In other words, when the administrator terminal 60 is out of the wireless LAN range of the service providing device 20, the user terminal 50 is not connectable to the service providing device 20 regardless of a distance between the user terminal 50 and the service providing device (See FIG. 7B). The administrative system of the second embodiment is essentially the same as that of the first embodiment described above, excluding different points in processes performed by programs on the service providing device 20, the user terminal 50, and the administrator terminal 60 constituting the administrative system. Hence, FIG. 2 used for describing the administrative system of the first embodiment will also be used for the second embodiment, and a description of the hardware constructions of the service providing device 20, the user terminal 50, and the administrator terminal 60 will be omitted here.

FIG. 7C is a flowchart showing the steps in a process for registering a service providing device executed by an administrative program on the user terminal 50. In this process, the user terminal 50 selects and registers a service providing device 20 that will allow the user terminal 50 to request a service.

As shown in FIG. 7C, the user terminal 50 searches for an administrator terminal 60 in step S601. When the administrative system is a piconet using Bluetooth technology, a command such as an Inquiry command is issued to check whether an administrator terminal 60 capable of communicating within the connectable range α (see FIG. 1A) exists.

After searching for an administrator terminal 60 in S601, the user terminal 50 determines whether a connectable administrator terminal 60 has been found in S603. If the user terminal 50 determines that a connectable administrator terminal 60 has not been found (No in S603), this indicates that an administrator terminal 60 does not exist within the connectable range α of the wireless LAN used by the user terminal 50, in other words, that the user terminal 50 does not exist within the area under the care and supervision of the administrator. Therefore, the predetermined process (here, the process to register the service providing device 20) performed by the user terminal 50 must be rejected. In step S621, a message rejecting registration of the service providing device 20 is displayed on the display of the input/output unit 53. In step S623, the device ID of the service providing device 20 saved in RAM on the control unit 51 is deleted, and the service provision device registering process ends.

However, if it is determined that a connectable administrator terminal 60 exists in S603 (Yes in S603), this indicates that a user terminal 50 exists within the area under the care and supervision of the administrator. Next, in step S604, the user terminal 50 determines whether the administrator has authorized registration of the user terminal 50.

The step of S604 is performed to reconfirm with the administrator whether the user terminal 50 is authorized to register the service providing device 20. Here, if unable to supervise, the administrator can reject registration of the service providing device 20 by the user terminal 50 by not granting registration authorization, even if an administrator terminal 60 exists within the connectable range α of the user terminal 50. Hence, administration by the user terminal 50 can be more stringently managed. Step S604 is not always necessary and can be removed if stringent management is deemed unnecessary.

If the administrator authorizes registration of the service providing device 20 (Yes in S604), then a process is performed to search for a service providing device 20 in S605. However, if registration of the service providing device 20 is not authorized (No in S604), then a registration rejection message is displayed in S621, as described above, and the device ID registered in the RAM in the control unit 51 is deleted in S623 and the registration process ends.

After searching for a service providing device 20 in S605, a process is conducted in S607 to determine whether a service providing device 20 is found. If a service providing device 20 is not found in this process (No in S607), then the registration process ends, as no service providing device 20 exists to be registered. However, if one or more service providing devices 20 are found (Yes in S607), then the device IDs of the service providing devices 20 found in S605 (or identifying data based on the device IDs) are displayed on the display of the input/output unit 53 in S609. The device IDs of the service providing devices 20 found above are temporarily stored in the work area allocated in the RAM of the control unit 51.

In S613, the user terminal 50 performs a process to select a service providing device 20 to request a service from the list of service providing devices 20 displayed on the display of the input/output unit 53. The selection process in S613 is performed by the user possessing the user terminal 50. The content displayed on the input/output unit 53 is the same as that shown in FIG. 4 and described in the first embodiment.

After the service providing device 20 is selected in S613, the device ID of the selected service providing device 20 is recorded in S615 in a registration list allocated in the RAM of the control unit 51. After the process to store the device ID is completed, the registration process ends.

Next, the service requesting process will be described with reference to FIG. 8. The service requesting process is a process by which the user terminal 50 requests various services from the service providing device 20 registered as described above.

Figure 8:
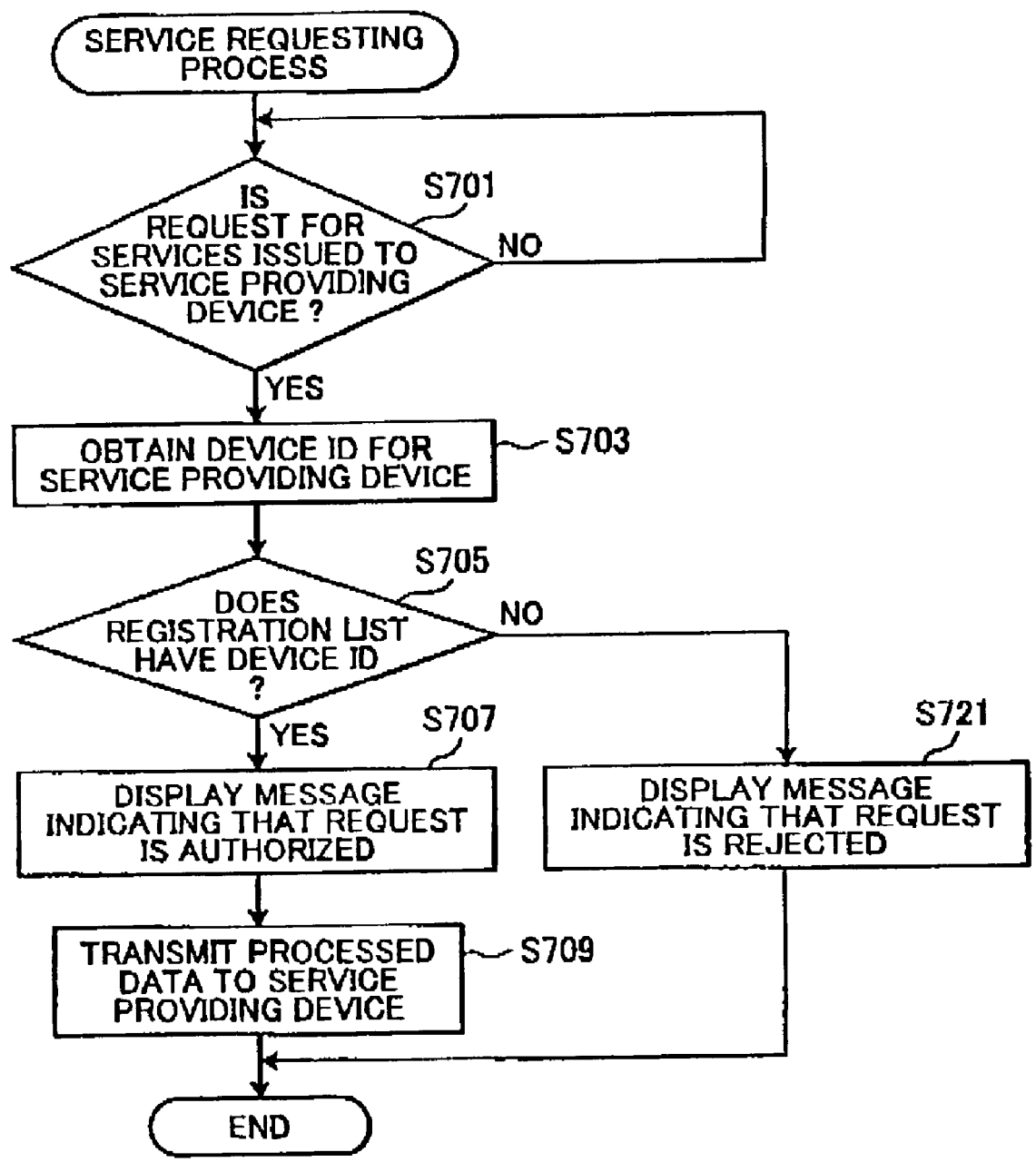
FIG. 8 is a flowchart showing steps in a process for requesting services that is executed by the user terminal device according to the second embodiment.

As shown in FIG. 8, the user terminal 50 uses an ordinary predetermined interrupt in step S701 to monitor whether or not a request for a service has been issued to the service providing device 20 by input from the input/output unit 53. If there is a request via the input/output unit 53 (Yes in S701), then the user terminal 50 performs a process in S703 to acquire the device ID of the service providing device 20 that exists within the connectable range of the wireless LAN. In S705, the user terminal 50 performs a process to determine whether the acquired device ID exists in the registration list allocated in the RAM of the control unit 51.

If it is determined that the acquired device ID does not exist in the registration list (No in S705), this indicates that the user terminal 50 has not been authorized to request services from the service providing device 20. In S721, a message indicating that the request for services has been rejected is displayed on the display of the input/output unit 53, and the service requesting process ends.

However, if it is determined that the acquired device ID exists in the registration list (Yes in S705), this indicates that the service user terminal 50 has been authorized to request services from the service providing device 20. Hence, in S707, a message indicating that the request for service provision has been authorized is displayed on the display of the input/output unit 53. In S709, the user terminal 50 transmits processed data for the requested service to the service providing device 20, and the service requesting process ends.

In this way, the process for registering the service providing device 20 is authorized in steps S609, S613, and S615, when the user terminal 50 determines that the service providing device 20 can be connected via a wireless LAN (YES in S607), and that the administrator terminal 60 can be connected via a wireless LAN (Yes in S603). In other words, since the user terminal 50 is within the area under the care and supervision of the administrator, the process for registering the service providing device 20 performed by the user terminal 50 can be entrusted to the user of the user terminal 50. Accordingly, the present invention has the effect of enabling the user terminal 50 to manage requests for various services from the service providing device 20 without burdening the administrator.

Figure 9:
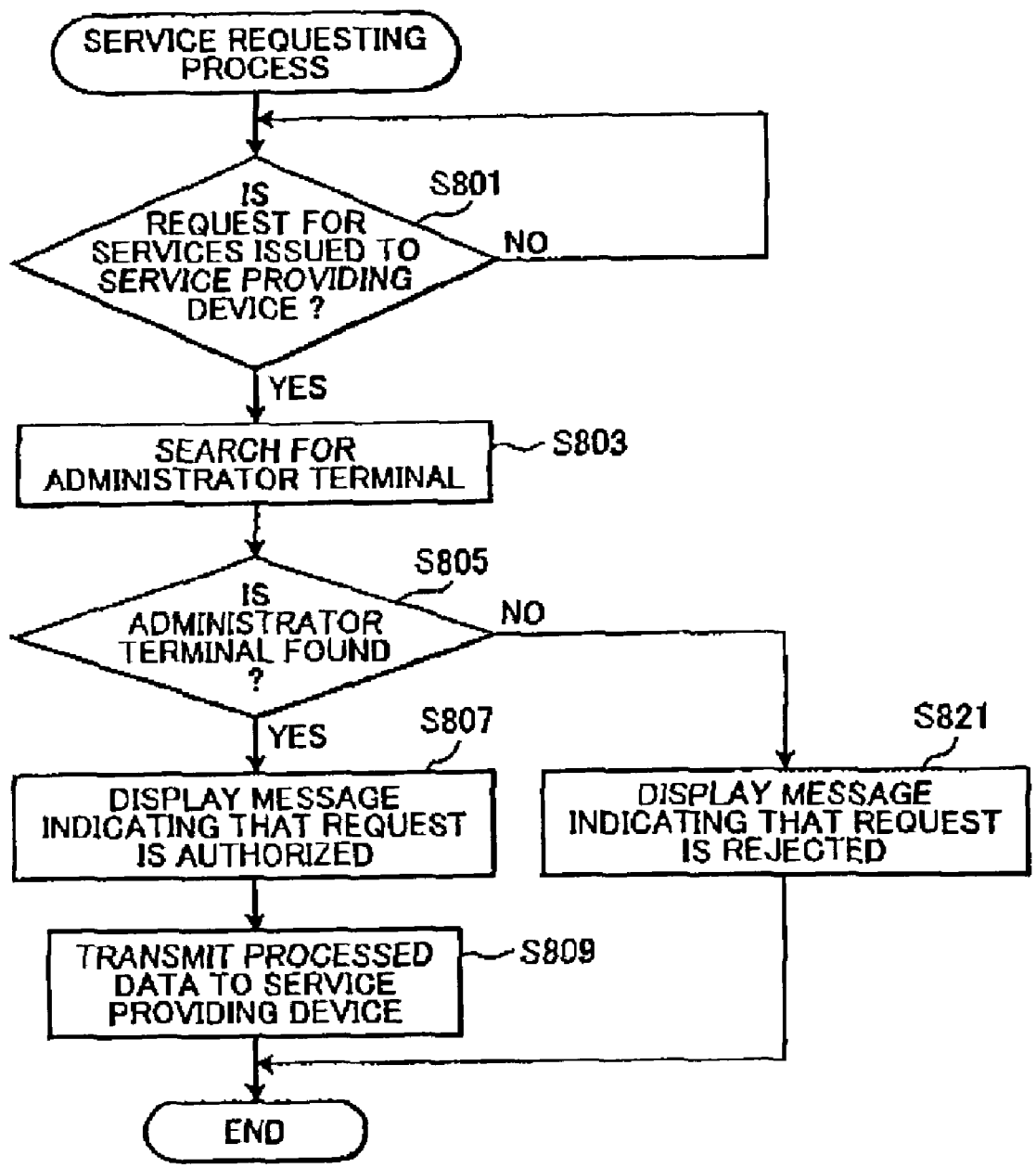
FIG. 9 is a flowchart showing steps in a modification of the service requesting process of FIG. 8 that is executed by the user terminal device according to the second embodiment.

A process for requesting services from the service providing device can also be executed according to the process shown in FIG. 9. In S801 of FIG. 9, the user terminal 50 monitors whether a request for services has been issued to the service providing device 20 through input from the input/output unit 53. If a request has been issued from the input/output unit 53 (Yes in 5801), then the user terminal 50 executes a process in S803 to search for an administrator terminal 60. In S805, the user terminal 50 determines whether an administrator terminal 60 has been found. Based on the results of this determination, the user terminal 50 can perform processes in steps S807, S809, and S821 in the same way as the processes were executed in S707, S709, and S721 described above.

According to this process, the user terminal 50 can be authorized to request services from the service providing device 20 if an administrator terminal 60 exists within the connectable range of the wireless LAN. In other words, when the user terminal 50 is within the area under the care and supervision of the administrator, the administrator can confirm the user of the user terminal 50. Accordingly, the user of the user terminal 50 can manage service requests to the service providing device 20 without requiring a complex registration procedure. Therefore, the user terminal 50 can manage requests for services sent to the service providing device 20 without burdening the administrator and the user.

In the embodiments described above, an example was given in which the service providing device 20 provides predetermined services based on processed data received from the user terminal 50. However, the services provided by the service providing device 20 do not need to be services performed on processed data provided from the user terminal 50. For example, the service providing device 20 can provide a service according to a copy function (a function based on the copy unit 34) disposed in the service providing device 20.

An image outputting system according to a third embodiment of the present invention will be described while referring to FIGS. 10-15. In the following description, all users of a printer possess cellular telephones provided with a Bluetooth-compliant communication device as user terminals. It should be noted that any kind of user terminals other than the cellular telephones are within the scope of the present invention.

Figure 10:
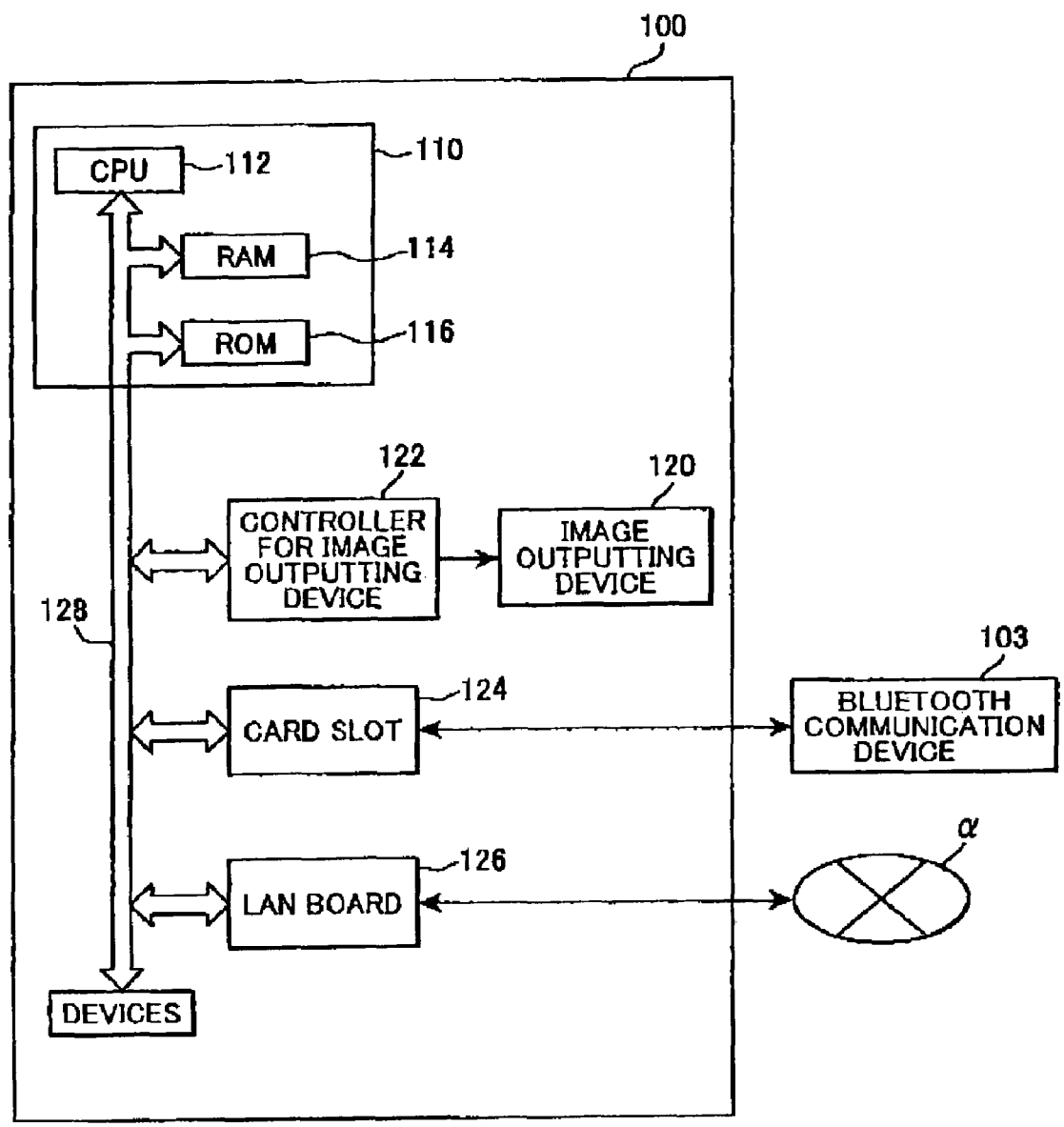
FIG. 10 is a block diagram showing the construction of a printer according to a third embodiment of the present invention.

As shown in FIG. 10, a printer 100 includes a central control unit 110, an image outputting device 120 for developing images from toner on a printing paper, and a control circuit 122 for controlling the formation of images on the paper by controlling the image outputting device 120 according to an output process described later. The central control unit 110 includes a CPU 112, a RAM 114 (including a backup battery), and a ROM 116. The printer 100 further includes a card slot 124 for connecting a card-type communication device, and a LAN board 126 for connecting the printer 160 to an in-house LAN α. The central control unit 110 is connected to the control circuit 122, the card slot 124, and the LAN board 26 via a bus 128. A card-type communication device 103 is connected to the printer 100 via the card slot 124. The communication device 103 is a Bluetooth-compliant communication device, and includes a function for varying the size of its communication range (piconet formation range) in multiple stages.

Figure 11:
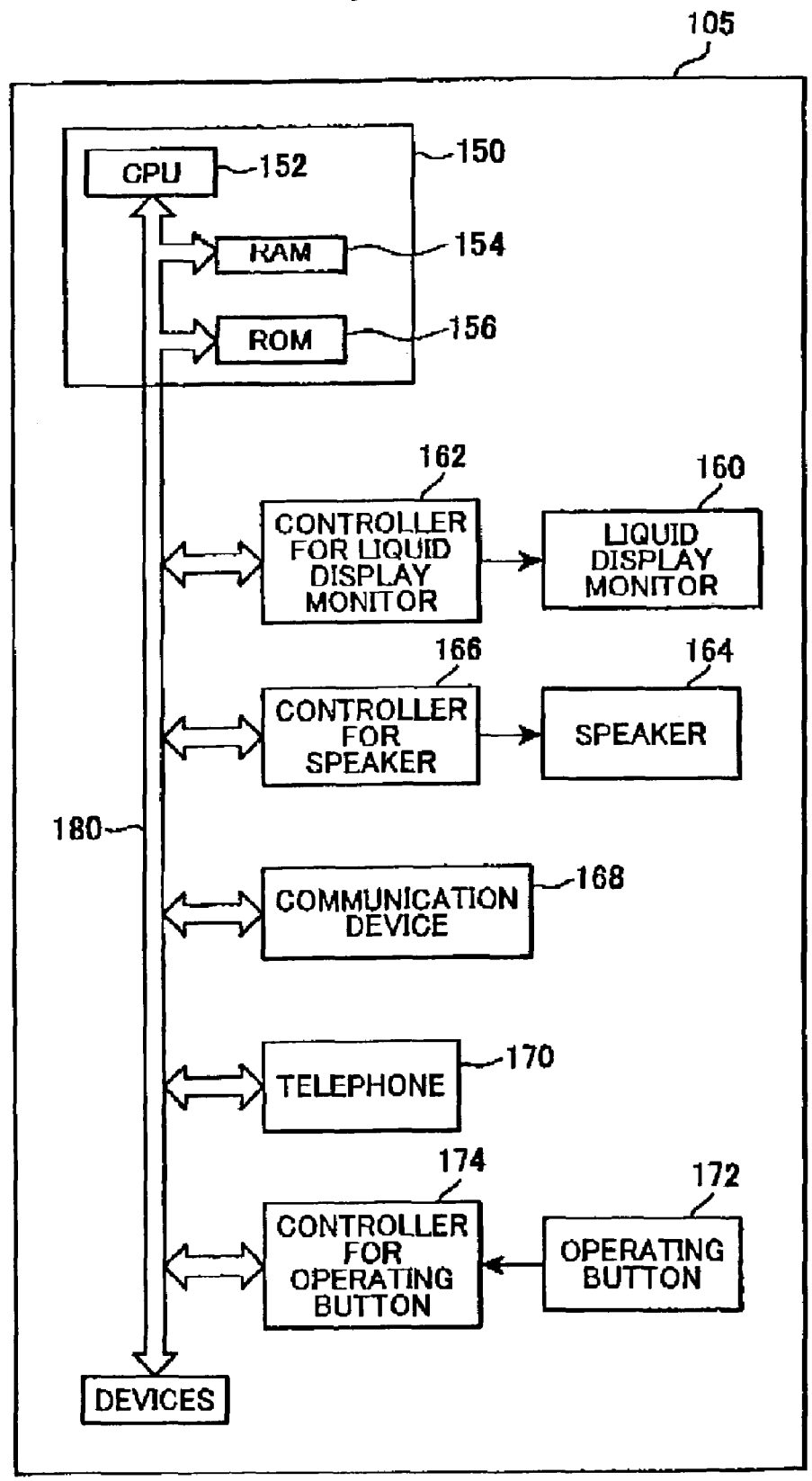
FIG. 11 is a block diagram showing the construction of a cellular telephone according to the third embodiment of the present invention.

As shown in FIG. 11, a cellular telephone 105 includes a central control unit 150, a liquid crystal display (LCD) 160 (see FIG. 12), a control circuit 162 for controlling the LCD 160, a speaker 164 (see FIG. 12), and a control circuit 166 for controlling the speaker 164. The central control unit 150 also includes a CPU 52, 1a RAM 154, and a ROM 156. The cellular telephone 105 also includes a Bluetooth-compliant communication device 168, a telephone device 170 for establishing a wireless telephone channel with a communication base station, operating buttons 172 (see FIG. 12), and a control circuit 174 for transmitting ON/OFF signals for the operating buttons 172 to the central control unit 150. The central control unit 150 is connected to the control circuit 162, the control circuit 166, the communication device 168, the telephone device 170, and the control circuit 174 via a bus 180.

Next, a security database stored in the RAM 114 of the printer 1 will be described. Here, FIG. 13A is a table showing the security database in more detail.

The security database is used in the output process is described later. The database stores associations between the user's name and ID of the user using the printer 100, the Bluetooth address (BD_ADDR) assigned to the communication device 168 provided in the user's cellular telephone 105, and the security level (Security Lv) of each user. The security level is set to a maximum value of A, and decreases in value in alphabetical order.

Next, print job data that is temporarily stored in the RAM 114 will be described. FIG. 13B is a table showing this print job data.

Print job data is created during the output process described later. The data includes an association between the ID of the user using the printer 100, the security level of each user, the length of the job data, and the job data itself.

Next, the output process executed by the central control unit 10 will be described.

Figure 14:
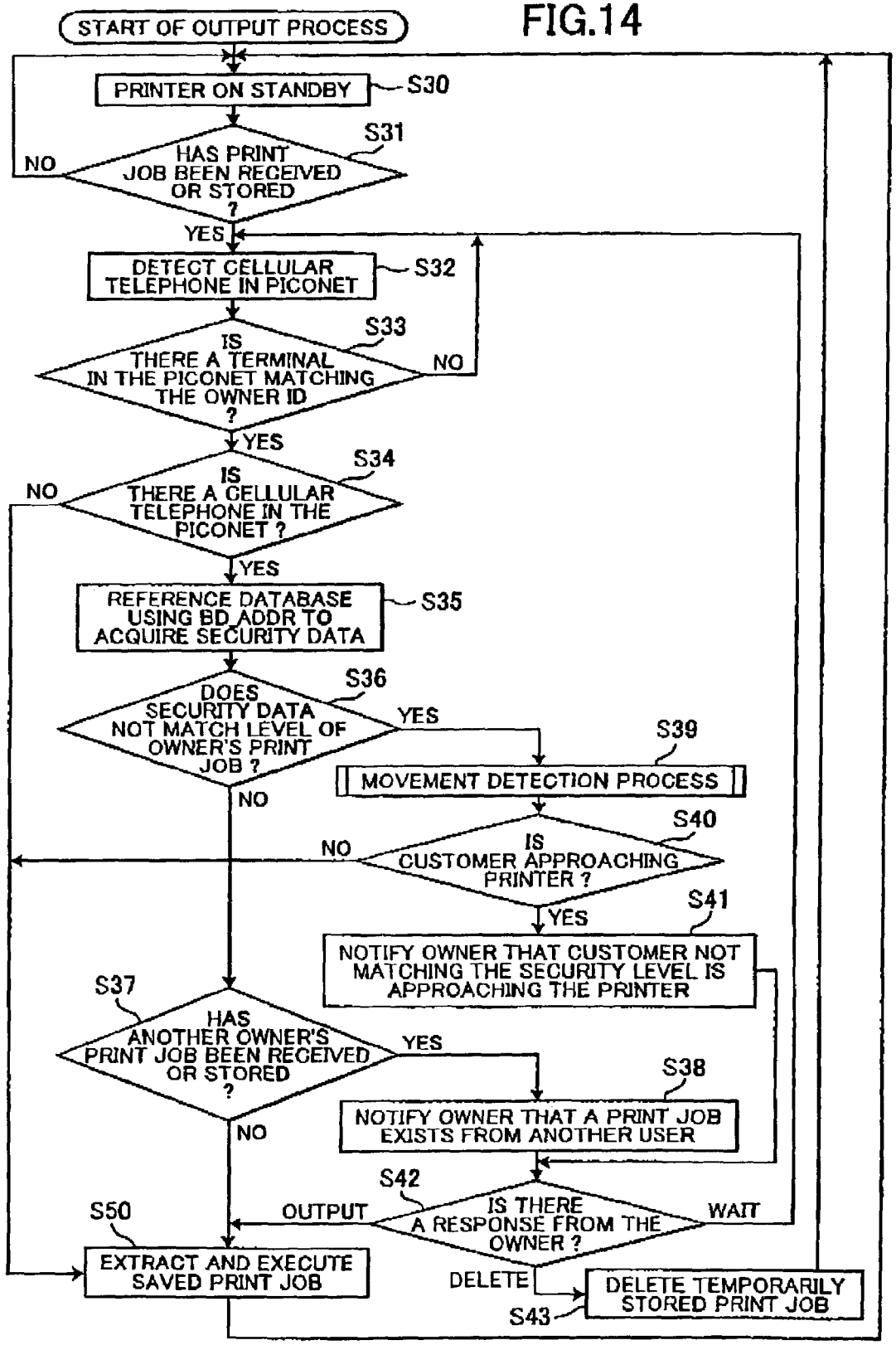
FIG. 14 is a flowchart showing the steps in an output process executed by the printer of FIG. 10.

FIG. 14 is a flowchart showing the output process. This process is started when a power switch (not shown) of the printer 100 is turned ON.

At the beginning of the output process, a standby process is executed in S30. In S31, the central control unit 110 determines whether a print job has been inputted into the printer 100 from an external device via the in-house LAN α (see FIG. 10). If the determination is negative, then the standby process of S30 is repeated and the printer remains in standby. In the present embodiment, a print job inputted via the LAN α is data such as that shown in FIG. 13B and having the common job data length and user ID associated with the job data itself. The job data is temporarily stored in the RAM 114 via the LAN board 126.

If the central control unit 110 determines that print data has been inputted into the printer 100 (Yes in S31), then a process is executed in S32 to detect whether the cellular telephone 105 is located within the communication range of the communication device 103 (within the piconet). The person belonging to the user ID associated with the received print job will hereinafter be called the "owner."

In S33, the central control unit 110 determines whether a cellular telephone 105 having a user ID matching the user ID of the owner is one of the cellular telephones 105 detected in S32. In this determination process, the printer 100 receives a BD_ADDR from the cellular telephone 105, refers to the security database stored in the RAM 114 (see FIG. 13A), and determines whether the user ID conforming to the received BD_ADDR matches the user ID associated with the print job. If the determination is negative (No in S33), then the steps of S32 and S33 are repeated until it is determined that the cellular telephone 105 possessed by the owner is located in the communication range of the communication device 103 (within the piconet; Yes in S33).

If it is determined that the owner's cellular telephone 105 is located within the communication range of the communication device 103 (Yes in S33), then the central control unit 110 determines in S34 whether the cellular telephone 105 belonging to a user other than the owner (hereinafter referred to as the "customer") is also located with the communication range of the communication device 103. If the central control unit 110 does not detect a customer's cellular telephone 105 (No in S34), then the image outputting device 120 executes a printing process based on the print job associated with the user ID of the owner temporarily stored in the RAM 114.

However, if the central control unit 110 detects a customer's cellular telephone 105 (Yes in S34), then in S35 the central control unit 110 executes a process to detect the security level of the detected cellular telephone 105. In this process, the central control unit 110 executes a process to detect a security level by referencing the security database stored in the RAM 114 based on the BD_ADDR received from the customer's cellular telephone 105.

In S36, the central control unit 110 determines whether data in the security data detected in S35 matches the security settings of the owner' print job. That is, the central control unit 110 determines whether the security level of the owner's print job is the same as or higher than the customer's security level. For example, if the owner is Assistant Manager C, as shown in FIG. 13A, and the customer is Employee D or Employee E, then the security level "D" of the customer is lower than the security level "C" of the owner. Hence, in S36, the central control unit 110 determines that the security level does not match the security settings (Yes in S36). However, if the customer is General Manager A, then the security level of the customer ("A" in this case) is higher than that of the owner, and the central control unit 110 determines that the security level conforms to the security settings (No in S36).

If the security level of the customer conforms to the security data (No in S36), then the central control unit 110 determines in S37 whether the print job of a user other than the owner has been inputted into the printer 100 via the LAN α or is stored in the RAM 114. If this determination is negative (No in S37), then the owner's print job is executed in S50. However, if the determination is positive (Yes in S37), then a process is executed in S38 to notify the cellular telephone 105 of the owner that the print job of another user exists. In the present embodiment, if the owner is Assistant Manager C, the personal computer of Assistant Manager C's subordinate Employee D or Employee E has inputted a print job into the printer 1, and Assistant Manager C does not wish Employee D or Employee E to see the material that Assistant Manager C is about to print on the printer 1 for in-office reasons, then the cellular telephone 5 of Assistant Manager C is notified that Employee D or Employee E has also requested a print job to indicate the possibility of Employee D or Employee E approaching the printer 100 and seeing the material printed by Assistant Manager C.

If the central control unit 110 determines that the security data detected in S35 does not conform to the security settings of the owner's print job (Yes in S36), then the central control unit 110 executes in S39 a movement detection process described later. The process of S39 is executed to detect whether the customer's cellular telephone 105 detected in S32 is approaching or moving away from the printer 100 within the communication range of the communication device 103.

In S40, the central control unit 110 determines whether the customer's cellular telephone 105 is approaching the printer based on the result of the movement detection process of S39. If the central control unit 110 determines that the cellular telephone 105 belonging to the customer is moving away from the printer 100 or, if moving toward the printer 100, is not moving a long distance or almost not at all, as in a roaming state (No in S40), then in S50 the central control unit 110 prints the owner's print job temporarily stored in the RAM 114. However, if the central control unit 110 determines that the cellular telephone 105 belonging to the customer is approaching the printer 100 (Yes in S40), then data is transmitted to the cellular telephone 105 belonging to the owner in S41 notifying the owner that there is a customer not conforming to the security settings approaching the printer 100. For example, when the owner is Assistant Manager C and the customer is a subordinate Employee D or Employee E and when Assistant Manager C does not wish, for in-house reasons, Employee D or Employee E to view the printed material that Assistant Manager C is about to print on the printer 100, then the cellular telephone 105 of Assistant Manager C is notified that Employee D or Employee E is approaching the printer 100, and that there is a possibility of Employee D or Employee E seeing the printed material.

Figure 12:
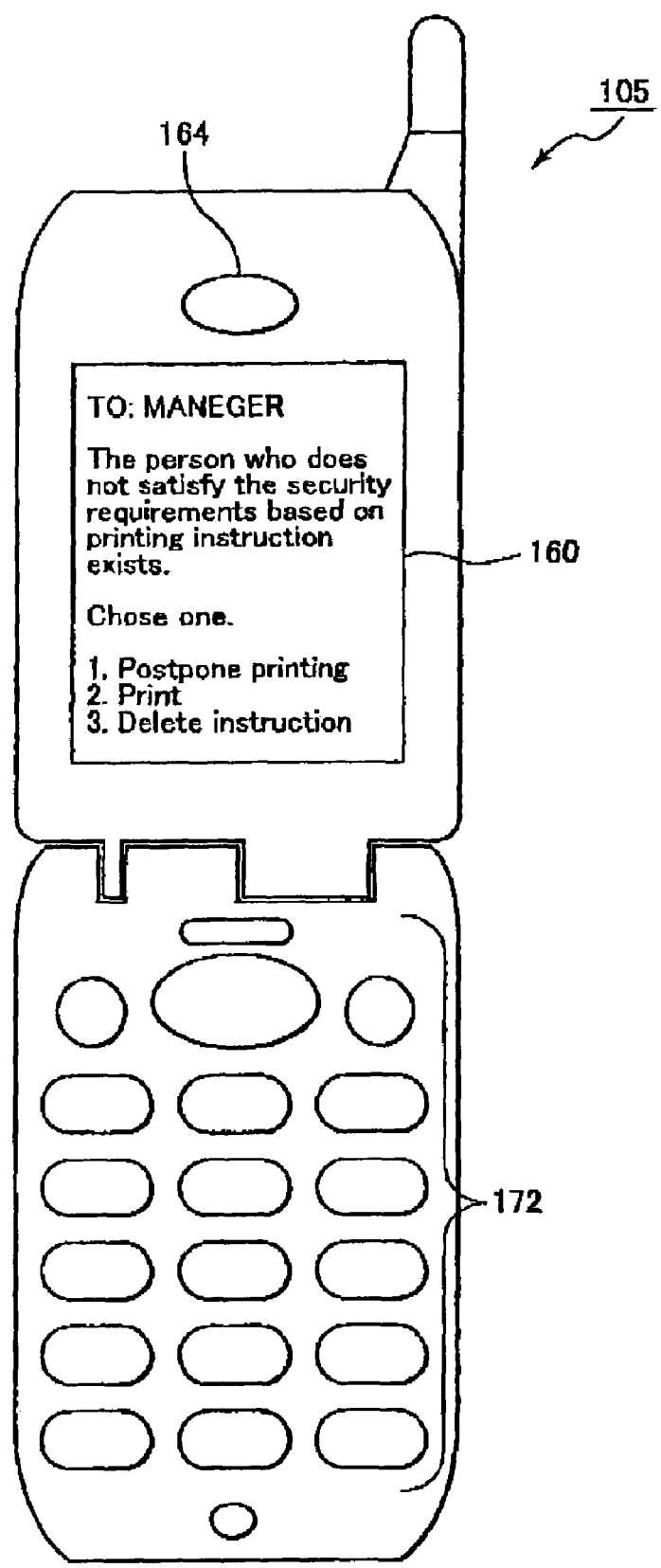
FIG. 12 is an external view of the cellular telephone in FIG. 11.

When the process of S38 or S41 is executed, a message based on notification data, such as that shown in FIG. 12, is displayed on the owner's cellular telephone 105. The message includes a menu of operation commands, including "1. Delay output," "2. Output," and "3. Delete job." The owner selects one of these commands with the cellular telephone 105 and the command is transmitted to the printer 100 via the communication device 103. In S42, the central control unit 110 determines which of the three commands described above is the received operating command.

If the received operating command is "2. Output," this indicates, for example, that Assistant Manager C determined that the material to be printed can be seen by Employee D or Employee E. Accordingly, the owner's print job temporarily stored in the RAM 14 in S31 is printed in S50. If the operating command is determined to be "3. Delete job," this indicates that Assistant Manager C has determined the printed material should not be seen by Employee D or Employee E and has decided to print the material later. In this case, a process is executed in S43 to delete the owner's print job currently stored in the RAM 114, and the process returns to step S30. If the operating command is determined to be "1. Delay output," this indicates that Assistant Manager C wishes to wait until Employee D or Employee E is no longer near the printer 100 and will no longer have a chance of seeing the printed material. In this case, the process of S32 is executed again and the printer waits until a negative determination is found in either step S34 or S40.

Next, the movement detection process of S39 executed by the central control unit 110 will be described.

Figure 15:
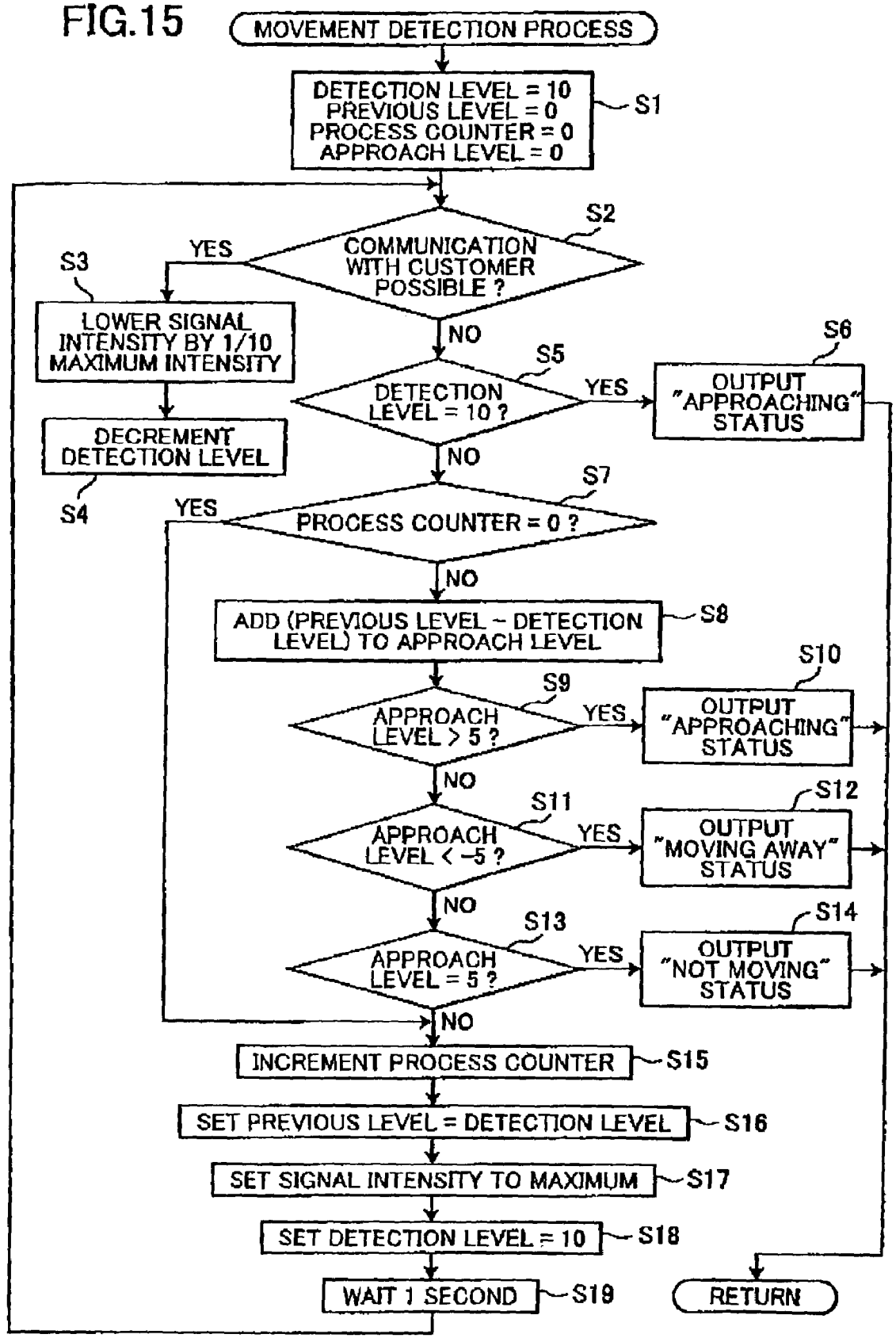
FIG. 15 is a flowchart showing the steps in a movement detection process executed by the printer of FIG. 10.

FIG. 15 is a flowchart showing the steps in the movement detection process.

At the beginning of this movement detection process in S1, four counters in the process are initialized. These counters include a detection level counter, a previous level counter, a process counter, and an approach level counter. The counters are stored in the RAM 114 and overwritten as needed during the following process. Of these counters, the detection level counter indicates the size of the communication range for the communication device 103, with a value of "10" indicating a maximum communication range (for example, a radius of 10 meters) and a value of "1" indicating a minimum range (for example, a radius of 1 meter). Here, the detection level counter is initialized to the maximum range of "10," while all other counters are initialized to "0."

In S2, the central control unit 110 determines whether it is possible to communicate with the customer's cellular telephone 105 with the current detection level counter since the detection level counter is set to "10" at the beginning of the movement detection process, the central control unit 110 determines whether communication is possible with the cellular telephone 105 within the maximum communication range from the communication device 103. If communication is possible (Yes in S2), then the signal intensity of the communcation device 103 is decreased $\frac{1}{10}^{th}$ in S3. That is, the communication range is decreased one level. In S4, the detection level counter is decremented, and the determination in step S2 is repeated. If the determination in S2 is positive (Yes in S2), then the signal intensity of the communication device 3 is again reduced $\frac{1}{10}^{th}$. This process is repeated to find the maximum communication range in which communication with the cellular telephone 105 is possible.

When it is determined that the communication device 103 cannot communicate with the cellular telephone 105 as the communication range of the communication device 103 is gradually narrowed (No in S2), then the central control unit 110 determines in S5 whether the detection level counter when communication becomes impossible is the maximum value of "10." If the detection level counter is set to "10" (Yes in S5), indicating that the cellular telephone 105 of the customer is located outside the maximum communication range of the communication device 103, then in S6 data indicating an "outside of communication range" status is stored in the RAM 114, and the process ends. If the detection level counter is less than the maximum value of "10" (No in S5), then the central control unit 110 determines in S7 whether the process counter is "0." Since the process counter was set to "0" at the beginning of the movement detection process, then the determination is positive (Yes in S7). Accordingly, the process counter is incremented in S15, that is, set to "1." In S16, the detection level decremented in S4 (let us say 8, for example) is set as the previous level counter. The signal intensity of the communication device 103 is set to its maximum value in S17. The detection level counter is reset to "10" in S18. The process pauses for one second in S19 before repeating the steps from S2, where the central control unit 110 determines once again at what detection level it is possible to communicate with the cellular telephone 105, as described above (S2-S4).

In S7, the central control unit 110 again determines whether the process counter is "0." At this time, the process counter is not "0," since the counter was incremented to "1" previously (No in S7). In S8, a process is executed to subtract the current detection level counter set in the second determination of S2 from the previous level counter set in S16, and the result is added to the approach level counter.

In S9, the central control unit 110 determines whether the approach level counter is larger than +5. If it is determined that the counter is larger than +5 (Yes in S9), then the central control unit 110 determines that the customer is approaching the printer 100 and data indicating a "customer approaching" status is stored in the RAM 14 in S10, and the process ends. For example, let us say that the previous level counter is "8" and the current level counter is "2." In this case, the cellular telephone 105 of the customer approached the printer 100 by more than 5 meters within an interval of one second, since the process paused 1 second in S19. Or if the approach level counter was previously set to 3 when the previous level counter was 8 and the detection level counter was 5 and subsequently the approach level counter is determined to be a total of 6 when the previous level counter is 5 and the detection level counter is 2, this indicates that the cellular telephone 105 approached the printer 100 by 5 meters or more within a 2-second interval. However, if the approach level counter is 5 or less, then the central control unit 110 determines that the customer is not approaching the printer 100 (No in S9).

If it is determined that the customer is not approaching the printer 100 in S9, then in S11 the central control unit 110 determines whether the approach level counter is smaller than −5. If the counter is determined to be smaller than −5 (Yes in S11), for example, when the previous level counter is 2 and the detection level counter is 8, then the customer is determined to be moving away from the printer 100, and data indicating a "customer moving away" status is stored in the RAM 114 in 512. However, if the approach level counter is greater than or equal to −5 (No in S11), it is determined that the customer is not moving away.

If the approach level counter is greater than or equal to −5 in S11, then the central control unit 110 determines in S13 whether the process counter is 5, that is, whether 5 seconds have elapsed since the beginning of the process. When the approach level is greater than +5 or less than −5, then the customer is either moving toward or moving away from the printer 100. However, if it is determined that the amount of movement is small and that the customer is moving very little, or roaming (Yes in S13), then data indicating a "not moving" status is stored in the RAM 114 in S14, and the process ends. However, if the process counter has not reached 5, then the processes beginning from step S15 are repeated and the movement detection process continues to execute until the process counter reaches 5.

In S40 of FIG. 14 described above, the central control unit 110 determines whether the customer is approaching the printer 100 based on the status set in the movement detection process.

The image outputting system described above has the following effects.

The image outputting system described above can restrict printing on the printer 100 (delay or delete a print job in S42) if a customer is near the printer 100 (Yes in S34), even when the owner is near the printer 100 (Yes in S33). Accordingly, the image outputting system can restrict output of printed material on the printer 100 when a customer not privileged to view the printed materials (Employee D or Employee E) is either near the printer 100 (Yes in S34) or approaching the printer 100 (Yes in S40), even when the owner (for example, Assistant Manager C) is near the printer 100 (within the piconet). Hence, the owner can effectively prevent a customer from viewing sensitive printed material.

When output of printed material is restricted because a customer not privileged to view the material is near the printer 100, the image outputting system can execute the output again (S50) if the customer moves away from the printer 100 (Yes in S11, No in S38), thereby avoiding the needless application of restrictions.

Since a restriction is not applied when the customer security level is higher than that of the owner (No in S36), the image outputting system can prevent the needless application of restrictions. Hence, when more than one customer is positioned near the printer 100, it is possible to print the owner's print job after only customers with a low security level have moved away from the printer 100.

When restrictions are applied to the output of printed material on the printer 100, notification data is transmitted to the cellular telephone 105 (S38, S41) and data based on the notification data is displayed on the cellular telephone 105. Accordingly, when about to output printed material to the printer 100, the owner can learn immediately whether the material may be exposed to an undesirable person. It is also possible to notify the customer's cellular telephone 5 that a restriction has been applied to the owner's print job. By this notification, the customer can learn immediately that an individual is attempting to output printed material that the customer is not privileged to view, thereby encouraging the customer to move away from the printer 100. Therefore, the image outputting system of the present invention can enhance the privacy of printed images, while achieving efficient operation of the printer 100.

After a restriction has been applied to output from the printer 100, the owner of the cellular telephone 105 can remove the restriction by transmitting a command to that effect (Output in S41). Accordingly, the owner can output printed material on the printer 100 when the material is not sensitive, thereby preventing the needless application of restrictions.

While the invention has been described in detail with reference to specific embodiments thereof, it would be apparent to those skilled in the art that many modifications and variations may be made therein without departing from the spirit of the invention, the scope of which is defined by the attached claims.

For example, the above embodiment included a description of a printer. However, the present invention can be applied to any device that outputs images such as a television, projector, and facsimile machine.

The communication device 103 need not be installed in the printer 100, but can be provided nearby the printer 100, while achieving the same effects. Further, the above embodiment described an example with cellular telephones 105 carried by users of the printer 100. However, a similar type of communication device can be used in place of the cellular telephone. For example, a nameplate incorporating a communication device may be used. In this case, notifications in S38 and S41 can be made to a personal computer belonging to the owner or from which the owner outputted the print job, and the owner can also respond to the notifications from the personal computer. A speaker may also be provided in the nameplate to notify the wearer by sound.

The security level described above need not be based on in-office ranks (General Manager, Section Manager, Assistant Manager, etc.), but can also be based on age, or gender. While a printer was described in the above embodiment, the process can also be executed for a display device. In this case, a display can be terminated or blackened when a customer approaches the display device.

The embodiment described above employs a wireless LAN with Bluetooth as the communication standard for communicating with the cellular telephone 105, but another wireless LAN standard may be used.

While determination steps in S33, S34, S36, S37, S38, and S41 and related processes were described in the above embodiment, it is also possible to employ only determination steps and related processes deemed necessary. For example, if determination steps S33 and S37 and related processes are employed, then the printer can be configured to execute a print job when the owner is near the printer 100 (Yes in S33) and a print job has not been issued from another owner (No in S37). when employing determination step S34 and related processes, the print job is executed when the owner has issued a print job (Yes in S31) and the customer is not near the printer 1 (No in S34).

Since it is conceivable that multiple people may be using the printer 100 in the present system, the above-described customer can also execute a print job on the printer 100 as an owner.

In S38 of the embodiment described above, output is restricted when a print job from a user other than the owner has been received, regardless of security level. However, the system can also reference security levels for the print jobs and apply restrictions for a print job only when an issued print job is associated with a lower security level than that of the owner.

When the owner is near the printer 100 and a print job is issued from a customer having a lower security level than that of the owner, there is a high possibility that the customer will approach the printer 100. In this case, the execution of the owner's print job can be restricted, thereby more effectively preventing a third party from viewing the owner's job.

What is claimed is:

1. A service providing system comprising:
   a service providing device having a wireless communication range, the service providing device providing a service to perform a process in the communication range;
   an administrator terminal that administrates and connects to the service providing device via a wireless local area network in the wireless communication range;
   a user terminal that connects to the service providing device in the wireless communication range, the user terminal sending a request tar the service to the service providing device without passing through the administrator terminal;
   a determining device that determines whether the administrator terminal is connected to the service providing device in the wireless communication range; and an authorizing device that authorizes the service providing device to provide the service to the user terminal in accordance with the request only when the determining device determines that the administrator terminal is connected to the service providing device in the wireless communication range.

2. The service providing system according to claim 1, wherein the authorizing device authorizes the service providing device to register the user terminal that has been granted access to the service provided by the service providing device.

3. The service providing system according to claim 2, wherein the user terminal is allowed access to the service through the process for registering the user terminal when the administrator terminal is connected to the service providing device in the wireless communication range.

4. The service providing system according to claim 1, wherein the wireless communication range in which the service providing device and the administrator terminal are connected together is variable.

5. The service providing system according to claim 1, wherein the authorizing device authorizes the service providing device to perform the process when confirming that an authorization instruction has been received from the administrator terminal connected via the wireless network.

6. The service providing system according to claim 1, wherein the service produces an image based on data received from the user terminal.

7. The service providing system according to claim 1, wherein the wireless network is a short range wireless communications by a wireless local-area network.

8. A service providing system comprising:
a service providing device that provides a service to perform a process in response to a request; an administrator terminal;
a user terminal having a wireless communication range to connect to the service providing device and the administrator terminal that administrates and connects to the service providing device via a wireless local area network in the wireless communication range, the user terminal sending the request for the service to the service providing device without passing through the administrator terminal;
a determining device that determines whether the administrator terminal is connected to the user terminal in the wireless communication range; and
an authorizing device that authorizes the user terminal to send the request to the service providing device only when the determining device determines that the administrator terminal is connected to the user terminal network in the wireless communication range.

9. The service providing system according to claim 8, wherein a process authorized by the authorizing device is a process for registering the service providing device that grants the request.

10. The service providing system according to claim 9, wherein a period in which the user terminal is granted the request after the registering the service providing device according to the process is only when the administrator terminal is connected to the user terminal in the wireless communication range.

11. The service providing system according to claim 8, wherein the wireless network communication range in which the user terminal and administrator terminal are connected together is variable.

12. The service providing system according to claim 8, wherein the authorizing device authorizes the service providing device to perform the process when confirming that an authorization instruction has been received from the administrator terminal connected to the user terminal in the wireless communication range.

13. The service providing system according to claim 8, wherein the service produces an image based on data received from the user terminal.

14. The service providing system according to claim 8, wherein the wireless network is a short range wireless communications by a wireless local-area network.

15. A service providing device, comprising:
a main unit that has a wireless communication range and provides a service to perform a process, the main unit receiving a request for the service from a user terminal in the wireless communication range without passing through an administrator terminal that administrates and connects to the service providing device via a wireless local area network in the wireless communication range;
a determining unit that determines whether the administrator terminal is available to connect to the main unit in the wireless communication range; and
an authorizing unit that authorizes the main unit to provide the service to the user terminal in accordance with the request only when the determining unit determines that the administrator terminal is available in the wireless communication range.

16. The service providing device according to claim 15, wherein the process authorized by the authorizing unit is a process for registering the user terminal that has been granted access to the service.

17. The service providing device according to claim 16, wherein a time period in which the service is granted to the user terminal is a period in which the administrator terminal is connected to the service providing device in the wireless communication range.

18. The service providing device according to claim 15, wherein the authorizing unit authorizes the process when confirming that an authorization instruction has been received from the administrator terminal in the wireless communication range.

19. The service providing device according to claim 15, wherein the service produces an image based on data received from the user terminal.

20. The service providing system according to claim 15, wherein the wireless communication range is a short range wireless communications by a wireless local-area network.

21. The service providing device according to claim 20, wherein the wireless communication range is variable.

22. A user terminal, comprising:
a main unit that has a wireless communication range and sends a request for a service provided from a service providing device to the service providing device in the wireless communication range without passing through an administrator terminal that administrates and connects to the service providing device via a wireless local area network in the wireless communication range, the service being provided for performing a process;
a determining unit that determines whether the main unit is connected to the administrator terminal in the wireless communication range; and
an authorizing unit that authorizes the main unit to send the request to the service providing device only when the determining unit determines that the main unit is connected to the administrator terminal in the wireless communication range.

23. The user terminal according to claim 22, wherein the process authorized by the authorizing unit in the user terminal is a process for registering the service providing device that grants the request.

24. The user terminal according to claim 23, wherein a time period in which the request is granted to the user terminal after registering the service providing device based on the process is a period in which the user terminal is connected to the administrator terminal in the wireless communication range.

25. The user terminal according to claim 22, wherein the wireless communication range is variable.

26. The user terminal according to claim 22, wherein the authorizing unit authorizes the service providing device to provide the service when confirming that an authorization instruction has been received from the administrator terminal in the wireless communication range.

27. The user terminal according to claim 22, wherein the service produces an image based on data received from the user terminal.

28. The service providing system according to claim 22, wherein the wireless communication range is a short range wireless communications by a wireless local-area network.

* * * * *